United States Patent
Walsh et al.

(10) Patent No.: US 7,321,554 B1
(45) Date of Patent: *Jan. 22, 2008

(54) METHOD AND APPARATUS FOR PREVENTING BLOCKING IN A QUALITY OF SERVICE SWITCH

(75) Inventors: Hugh Walsh, Sunnyvale, CA (US);
Donald Pannell, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 11/789,315

(22) Filed: Apr. 24, 2007

Related U.S. Application Data

(63) Continuation of application No. 10/141,096, filed on May 7, 2002, now Pat. No. 7,209,440.

(51) Int. Cl.
*G01R 31/08* (2006.01)
(52) U.S. Cl. .............. 370/230; 370/235; 370/412; 710/52; 710/57
(58) Field of Classification Search .............. None
See application file for complete search history.

(56) References Cited

U.S. PATENT DOCUMENTS 5,541,912 A 7/1996 Choudhury et al.

(Continued)

OTHER PUBLICATIONS

U.S. Appl. No. 10/071,417, filed Feb. 6, 2002, Pennell et al.

(Continued)

*Primary Examiner*—Bob A. Phunkulh

(57) ABSTRACT

A method, apparatus, and computer-readable media for sending a frame of data from a first channel to a second channel using at least one of m memory buffers for storing a frame, m being at least 2, in which n of the m buffers have an available status and p of the m buffers have an unavailable status, wherein m=n+p comprises reserving to the first channel one or more of the n buffers having the available status when a number q of the buffers reserved to the first channel is less than a capacity r, wherein q≦r; when a frame is received from the first channel, storing the frame in i of the q buffers and changing the status of the i buffers to unavailable, wherein 1≦i≦q; selectively assigning the frame to the second channel based on a number s of the q buffers, wherein s≦q; wherein if the frame is assigned to the second channel, the frame is sent to the second channel from the i buffers and the status of the i buffers is changed to available; wherein if the frame is not assigned to the second channel, the frame is discarded and the status of the i buffers is changed to available; wherein h of the n buffers having the available status are not reserved to any channel, wherein h+q≦n; stopping reserving buffers to the first channel when the second channel is congested and the number of buffers h not reserved to any channel is less than, or equal to, a first predetermined threshold; and starting reserving buffers to the first channel when the number of buffers h not reserved to any channel is greater than, or equal to, a second predetermined threshold.

36 Claims, 15 Drawing Sheets

U.S. PATENT DOCUMENTS

| | | | |
|---|---|---|---|
| 5,682,553 | A | 10/1997 | Osborne |
| 5,889,779 | A | 3/1999 | Lincoln |
| 5,901,147 | A | 5/1999 | Joffe |
| 5,914,934 | A | 6/1999 | Rathnavelu |
| 6,018,515 | A | 1/2000 | Sorber |
| 6,169,748 | B1 | 1/2001 | Barbas et al. |
| 6,205,118 | B1 | 3/2001 | Rachnavelu |
| 6,246,682 | B1 | 6/2001 | Roy et al. |
| 6,256,315 | B1 | 7/2001 | Barbas et al. |
| 6,262,986 | B1 | 7/2001 | Oba et al. |
| 6,262,989 | B1 | 7/2001 | Gemar et al. |
| 6,539,024 | B1 | 3/2003 | Janoska et al. |
| 6,618,390 | B1 | 9/2003 | Erimli et al. |
| 6,625,159 | B1 | 9/2003 | Singh et al. |
| 6,687,254 | B1 | 2/2004 | Ho et al. |
| 6,704,316 | B1 | 3/2004 | He |
| 7,007,071 | B1 | 2/2006 | Brown |
| 7,035,273 | B1 * | 4/2006 | Pannell et al. .............. 370/412 |
| 7,139,280 | B2 * | 11/2006 | Mansour et al. ............ 370/412 |

OTHER PUBLICATIONS

Abbijit K. Choudbury and Ellen J. Hahne, "Dynamic Queue Length Thresholds for Shared-Memory Packet Switches," Bell Laboratories, Holmdel, NJ, IEEE/ACM Transactions on Networking, vol. 6, No. 2, Apr. 1998, pp. 130-140.

Nong, Ge and Hamdi, Mounir, "On the Provision of Quality-of-Service Guarantees for Input Queued Switches," IEEE Communication Magazine, Dec. 2000, pp. 62-77.

Seifert, Rich, "The Switch Book: The Complete Guide to LAN Switching Technology," Wiley Computer Publishing; New York, New York, 2000, Chapter 13, pp. 515-544.

Cyriel Minkenberg and Ton Engbersen, "A Combined Input and Output Queued Packet-Switched System Based on PRIZMA Switch-on-a-Chip Technology," IEEE Communication Magazine, Dec. 2000, pp. 70-77.

H. Jonathan Chao, Cheuk H. Lam, Eji Oki, "Broadband Packet Switching Technologies: A Practical Guide to ATM Switches and IP Routers," New York, New York, 2001, pp. 321-324.

IEEE Std 802.3—2002 (Revision of IEEE Std 802.3 2000 Edition) IEEE Standard for information technology—Telecommunications and information exchange between systems—Local and metropolitan area networks—Specific requirements; Part 3: Carrier sense multiple access with collision detection (CSMA/CD) access method and physical layer specifications; Mar. 8, 2002; 1538 pages.

* cited by examiner

METHOD AND APPARATUS FOR PREVENTING BLOCKING IN A QUALITY OF SERVICE SWITCH

CROSS-REFERENCE TO RELATED APPLICATIONS

This application is a continuation of U.S. patent application Ser. No. 10/141,096 filed on May 7, 2002 now U.S. Pat. No. 7,209,440, which is related to U.S. Non-Provisional patent application Ser. No. 10/071,417 "Quality of Service Queueing System for A Network Switch," by Donald Pannell and Hugh Walsh, filed Feb. 6, 2002. The disclosures of the above applications are incorporated herein by reference.

BACKGROUND

The present invention relates generally to data communications, and particularly to a queuing system implementing multiple classes of service within a network switch.

The rapidly increasing popularity of networks such as the Internet has spurred the development of network services such as streaming audio and streaming video. These new services have different latency requirements than conventional network services such as electronic mail and file transfer. New quality of service (QoS) standards require that network devices, such as network switches, address these latency requirements. For example, the IEEE 802.1 standard divides network traffic into several classes of service based on sensitivity to transfer latency, and prioritizes these classes of service. The highest class of service is recommended for network control traffic, such as switch-to-switch configuration messages. The remaining classes are recommended for user traffic. The two highest user traffic classes of service are generally reserved for streaming audio and streaming video. Because the ear is more sensitive to missing data than the eye, the highest of the user traffic classes of service is used for streaming audio. The remaining lower classes of service are used for traffic that is less sensitive to transfer latency, such as electronic mail and file transfers.

FIG. 1 shows a simple network 100 in which a network switch 102 connects two devices 104A and 104B. Each of devices 104 can be any network device, such as a computer, a printer, another network switch, or the like. Switch 102 transfers data between devices 104 over channels 106A and 106B, and can also handle an arbitrary number of devices in addition to devices 104. Channels 106 can include fiber optic links, wireline links, wireless links, and the like.

FIG. 2 is a block diagram of a conventional shared-memory output-queue store-and-forward network switch 200 that can act as switch 102 in network 100 of FIG. 1. Switch 200 has a plurality of ports including ports 202A and 202N. Each port 202 is connected to a channel 204, a queue controller 206 and a memory 208. Each port 202 includes an ingress module 214 that is connected to a channel 204 by a physical layer (PHY) 210 and a media access controller (MAC) 212. Referring to FIG. 2, port 202A includes an ingress module 214A that is connected to channel 204A by a MAC 212A and a PHY 210A, while port 202N includes an ingress module 214N that is connected to channel 204N by a MAC 212N and a PHY 210N. Each port 202 also includes an egress module 216 that is connected to a channel 204 by a MAC 218 and a PHY 220. Referring to FIG. 2, port 202A includes an egress module 216A that is connected to channel 204A by a MAC 218A and a PHY 220A, while port 202N includes an egress module 216N that is connected to channel 204N by a MAC 218N and a PHY 220N.

FIG. 3 is a flowchart of a conventional process 300 performed by network switch 200. At power-on, queue controller 206 initializes a list of pointers to unused buffers in memory 208 (step 302). A port 202 of switch 200 receives a frame from a channel 204 (step 304). The frame enters the port 202 connected to the channel 204 and traverses the PHY 210 and MAC 212 of the port 202 to reach the ingress module 214 of the port 202. Ingress module 214 requests and receives one or more pointers from queue controller 206 (step 306). Ingress module 214 stores the frame at the buffers in memory 208 that are indicated by the received pointers (step 308).

Ingress module 214 then determines to which channel (or channels in the case of a multicast operation) the frame should be sent, according to methods well-known in the relevant arts (step 310). Queue controller 206 sends the selected pointers to the egress modules 216 of the ports connected to the selected channels (step 312). These egress modules 216 then retrieve the frame from the buffers indicated by the pointers (step 314) and send the frame to their respective channels 204 (step 316). These egress modules 216 then release the pointers for use by another incoming frame (step 318). The operation of switch 200 is termed "store-and-forward" because the frame is stored completely in the memory 208 before leaving the switch 200. The store-and-forward operation creates some latency, but only for the first frame of a stream of data. Because all of the switch ports 202 use the same memory 208, the architecture of switch 202 is termed "shared memory."

The queue controller 206 performs the switching operation by operating only on the pointers to memory 208. The queue controller 206 does not operate on the frames. If pointers to frames are sent to an egress module 216 faster than that egress module 216 can transmit the frames over its channel 204, the pointers are queued within that port's output queue 216. Because pointers accumulate only at the output side of switch 200, the architecture of switch 200 is also termed "output-queued." Thus switch 200 has a store-and-forward, shared-memory, output-queued architecture.

In an output-queued switch, the queue controller must enqueue a frame received on a port to all of the output queues selected for that frame before the next frame is completely received on that port. Thus at any time only one complete frame can be present at each input port, while the output queues can be arbitrarily large. Thus the latency of an output-queued switch has two components: ingress latency and egress latency. Ingress latency is the period between the reception of a complete frame at an ingress module and the enqueuing of the pointers to that frame at all of the output queues to which the frame is destined. Egress latency is the period between enqueuing of the pointers to a frame in an output queue of a port and the completion of the transmission of that frame from that port.

Of course, QoS is relevant only when the switch is congested. When the amount of data entering the switch exceeds the amount of data exiting the switch, the output queues fill with pointers to frames waiting to be transmitted. If congestion persists, the memory will eventually fill with frames that have not left the switch. When the memory is full, incoming frames are dropped. When memory is nearly full and free memory buffers are rare, QoS dictates the free buffers be allocated to frames having high classes of service. But when the switch is uncongested, free memory buffers are plentiful, and no preferential treatment of frames is necessary to achieve QoS.

QoS is implemented in an output-queued store-and-forward switch by controlling the overall latency for each frame such that frames having a high class of service experience less latency than frames having lower classes of service. Many conventional solutions exist to reduce egress latency. However, solutions for reducing ingress latency in an output-queued store-and-forward switch either do not exist, or have proven unsatisfactory.

In addition, conventional QoS switches are susceptible to blocking, such as head-of-line blocking, where a congested flow in a switch causes frames to be dropped from uncongested flows in the switch

SUMMARY

In general, in one aspect, the invention features a method, apparatus, and computer-readable media for sending a frame of data from a first channel to a second channel using at least one of m memory buffers for storing a frame, m being at least 2, in which n of the m buffers have an available status and p of the m buffers have an unavailable status, wherein m=n+p. It comprises reserving to the first channel one or more of the n buffers having the available status when a number q of the buffers reserved to the first channel is less than a capacity r, wherein q≦r; when a frame is received from the first channel, storing the frame in i of the q buffers and changing the status of the i buffers to unavailable, wherein 1≦i≦q; selectively assigning the frame to the second channel based on a number s of the q buffers, wherein s≦q; wherein if the frame is assigned to the second channel, the frame is sent to the second channel from the i buffers and the status of the i buffers is changed to available; wherein if the frame is not assigned to the second channel, the frame is discarded and the status of the i buffers is changed to available; wherein h of the n buffers having the available status are not reserved to any channel, wherein h+q≦n; stopping reserving buffers to the first channel when the second channel is congested and the number of buffers h not reserved to any channel is less than, or equal to, a first predetermined threshold; and starting reserving buffers to the first channel when the number of buffers h not reserved to any channel is greater than, or equal to, a second predetermined threshold.

Particular implementations can include one or more of the following features. The numbers s can have the values s=q or s=q−i. The selectively assigning step further comprises discarding the frame when the second channel is congested and the number of the s buffers is below a third predetermined threshold; discarding the frame when the second channel is not congested and the number of the s buffers is below a fourth predetermined threshold, wherein the third predetermined threshold is greater than the fourth predetermined threshold; and assigning the frame to the second channel when the number of the s buffers is equal to or greater than the third predetermined threshold. Each frame has one of a plurality of classes of service, wherein each class of service has associated therewith third and fourth predetermined thresholds, and wherein the selectively assigning step further comprises discarding the frame when the second channel is congested and the number of the buffers is below the third predetermined threshold of the associated class of service of the frame; discarding the frame when the second channel is not congested and the number of the buffers is below the fourth predetermined threshold of the associated class of service of the frame, wherein the third predetermined threshold of the associated class of service of the frame is greater than the fourth predetermined threshold of the associated class of service of the frame; and assigning the frame to the second channel when the number of the s buffers is equal to or greater than the third predetermined threshold of the associated class of service of the frame. A port is associated with the second channel, and the assigning step comprises sending, to the port, the identity of the i buffers storing the frame.

In general, in one aspect, the invention features a network comprising a network switch having m memory buffers for storing a frame of data, m being at least 2, in which n of the m buffers have an available status and p of the m buffers have an unavailable status, wherein m=n+p; a first device connected to the network switch by a first channel; a second device connected to the network switch by a second channel; wherein the first device selects the second device as a destination for the frame and sends the frame to the first channel; wherein the network switch reserves to the first channel one or more of the n buffers having the available status when the number q of the buffers reserved to the first channel is less than a capacity r, wherein q≦r; wherein when the frame is received from the first channel, the network switch stores the frame in i of the q buffers and changes the status of the i buffers to unavailable, wherein 1≦i≦q; and wherein the network switch selectively assigns the frame to the second channel based on a number s of the q buffers, wherein s≦q; wherein if the frame is assigned to the second channel, the frame is sent to the second channel from the i buffers and the status of the i buffers is changed to available; wherein if the frame is not assigned to the second channel, the frame is discarded and the status of the i buffers is changed to available; and wherein the second device receives the frame from the second channel if the frame is assigned to the second channel; wherein h of the n buffers having the available status are not reserved to any channel, wherein h+q≦n; wherein the network switch stops reserving buffers to the first channel when the second channel is congested and the number of buffers h not reserved to any channel is less than, or equal to, a first predetermined threshold; and wherein the network switch starts reserving buffers to the first channel when the number of buffers h not reserved to any channel is greater than, or equal to, a second predetermined threshold.

Particular implementations can include one or more of the following features. The numbers s can have the values s=q or s=q−i. The network switch discards the frame when the second channel is congested and the number of the s buffers is below a third predetermined threshold; discards the frame when the second channel is not congested and the number of the s buffers is below a fourth predetermined threshold, wherein the third predetermined threshold is greater than the fourth predetermined threshold; and assigns the frame to the second channel when the number of the s buffers is equal to or greater than the third predetermined threshold. Each frame has one of a plurality of classes of service, wherein each class of service has associated therewith third and fourth predetermined thresholds, and the network switch discards the frame when the second channel is congested and the number of the s buffers is below the third predetermined threshold of the associated class of service of the frame; discards the frame when the second channel is not congested and the number of the s buffers is below the fourth predetermined threshold of the associated class of service of the frame, wherein the third predetermined threshold of the associated class of service of the frame is greater than the fourth predetermined threshold of the associated class of service of the frame; and assigns the frame to the second channel when the number of the s buffers is equal to or greater than the third predetermined threshold of the associated class of service of the frame. The network switch comprises a port associated with the second channel; and a queue controller to send, to the port, the identity of the i buffers storing the frame.

In general, in one aspect, the invention features a method, apparatus, and computer-readable media for sending a frame of data from a first channel to a second channel using at least one of m memory buffers for storing a frame, m being at least 2, in which n of the m buffers have an available status and p of the m buffers have an unavailable status, wherein m=n+p. It comprises reserving to the first channel a request for one or more of the n buffers having the available status when a number q of the buffers reserved to the first channel is less than a capacity r, wherein q≦r; when a frame is received from the first channel, storing the frame in i of the q buffers and changing the status of the i buffers to unavailable, wherein 1≦i≦q; sending the frame to the second channel and changing the status of the i buffers to available; and exercising flow control on the first channel when a number s of the q buffers is below a first predetermined threshold, wherein s≦q; wherein h of the n buffers having the available status are not reserved to any channel, wherein h+q≦n; stopping reserving buffers to the first channel when the second channel is congested and the number of buffers h not reserved to any channel is less than, or equal to, a second predetermined threshold; and starting reserving buffers to the first channel when the number of buffers h not reserved to any channel is greater than, or equal to, a third predetermined threshold.

Particular implementations can include one or more of the following features. The numbers s can have the values s=q or s=q−i. Implementations can comprise terminating flow control on the first channel when the number of s buffers is above a fourth predetermined threshold. A port is associated with the second channel, and the assigning step comprises sending, to the port, the identity of the i buffers storing the frame. The exercising step comprises sending a pause frame to the first channel. The terminating step comprises sending a pause release frame to the first channel.

In general, in one aspect, the invention features a network comprising a network switch having m memory buffers for storing a frame of data, m being at least 2, in which n of the m buffers have an available status and p of the m buffers have an unavailable status, wherein m=n+p; a first device connected to the network switch by a first channel; and a second device connected to the network switch by a second channel; wherein the network switch reserves to the first channel one or more of the n buffers having the available status when a number q of the buffers reserved to the first channel is less than a capacity r of the reserve module, wherein q≦r; wherein when a frame is received from the first channel, the network switch stores the frame in i of the q buffers and changes the status of the i buffers to unavailable, wherein 1≦i≦q; wherein the network switch sends the frame to the second channel and changes the status of the i buffers to available; wherein the network switch exercises flow control on the first channel when a number s of the q buffers is below a first predetermined threshold, wherein s≦q; and wherein the second device receives the frame from the second channel.

wherein h of the n buffers having the available status are not reserved to any channel, wherein h+q≦n;

wherein the network switch stops reserving buffers to the first channel when the second channel is congested and the number of buffers h not reserved to any channel is less than, or equal to, a second predetermined threshold; and wherein the network switch starts reserving buffers to the first channel when the number of buffers h not reserved to any channel is greater than, or equal to, a third predetermined threshold.

Particular implementations can include one or more of the following features. The numbers s can have the values s=q or s=q−1. The network switch terminates flow control on the first channel when the number of s buffers is above a fourth predetermined threshold. The network switch comprises a port associated with the second channel; and a queue controller to send, to the port, the identity of the i buffers storing the frame. The network switch sends a pause frame to the first channel. The network switch sends a pause release frame to the first channel.

The details of one or more implementations are set forth in the accompanying drawings and the description below. Other features will be apparent from the description and drawings, and from the claims.

Figure 1:
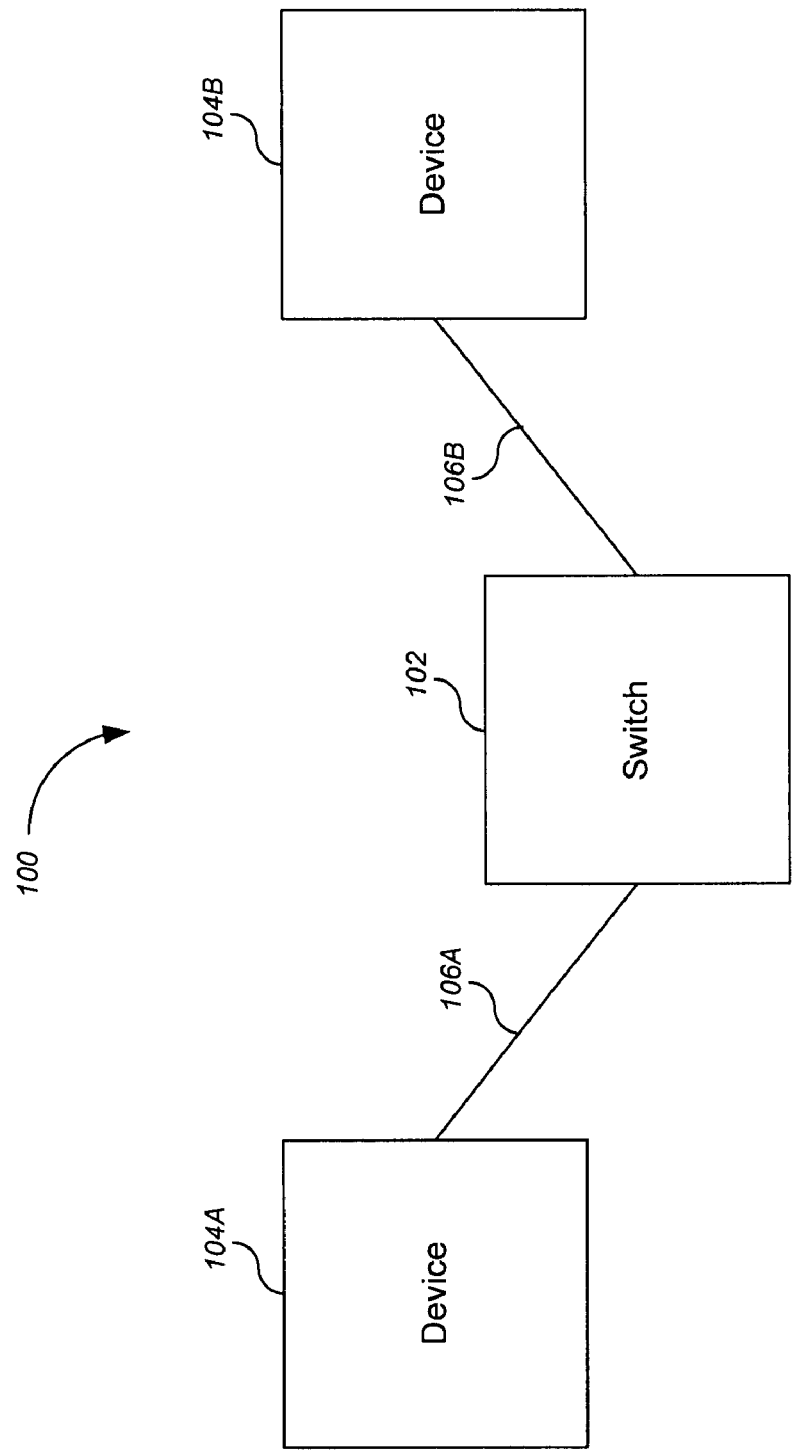
FIG. 1 shows a simple network in which a network switch connects two devices.

The leading digit(s) of each reference numeral used in this specification indicates the number of the drawing in which the reference numeral first appears.

DETAILED DESCRIPTION

Figure 2:
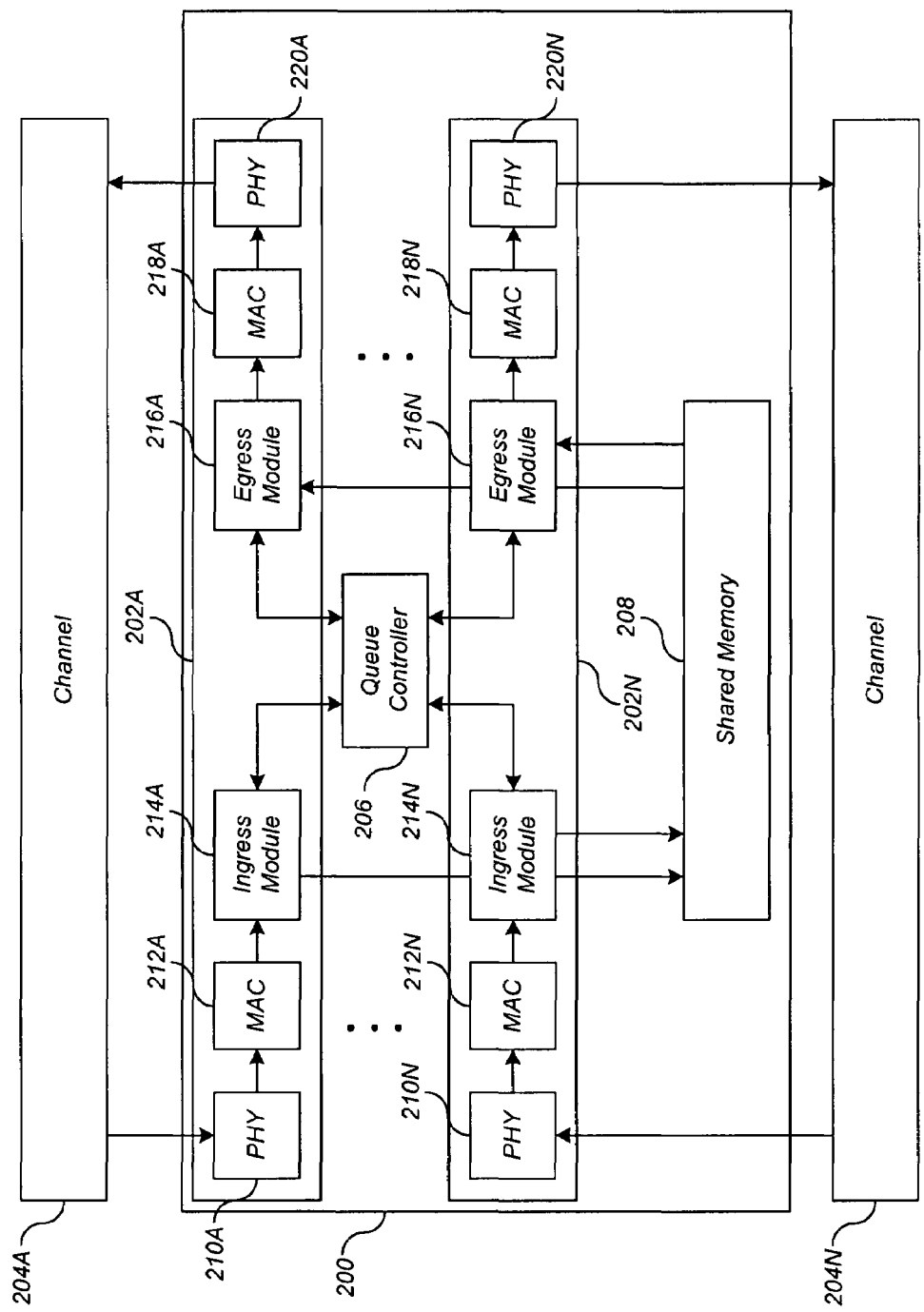
FIG. 2 is a block diagram of a conventional shared-memory output-queue store-and-forward network switch that can act as the switch in the network of FIG. 1.
Figure 3:
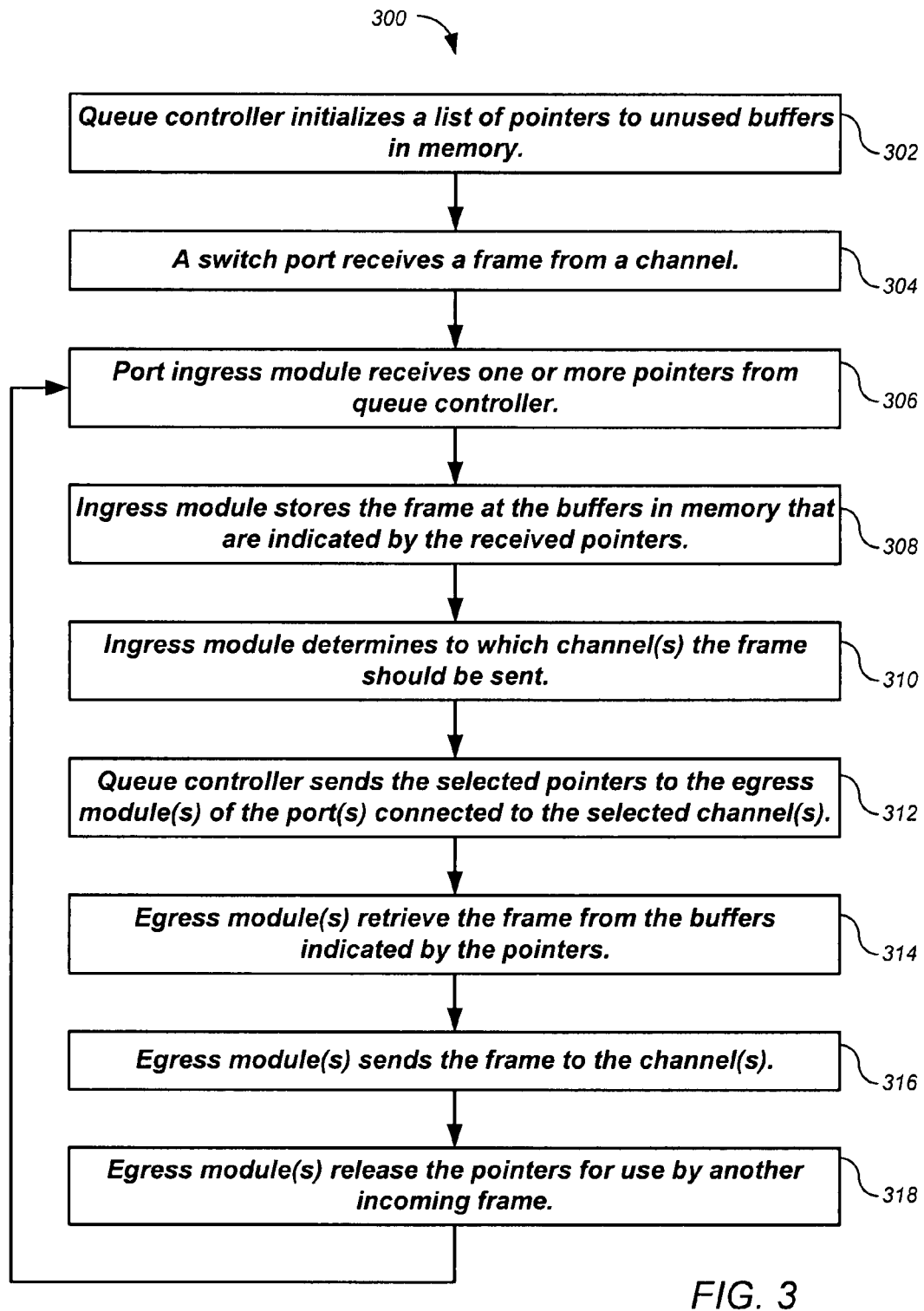
FIG. 3 is a flowchart of a conventional process performed by network switch.
Figure 4:
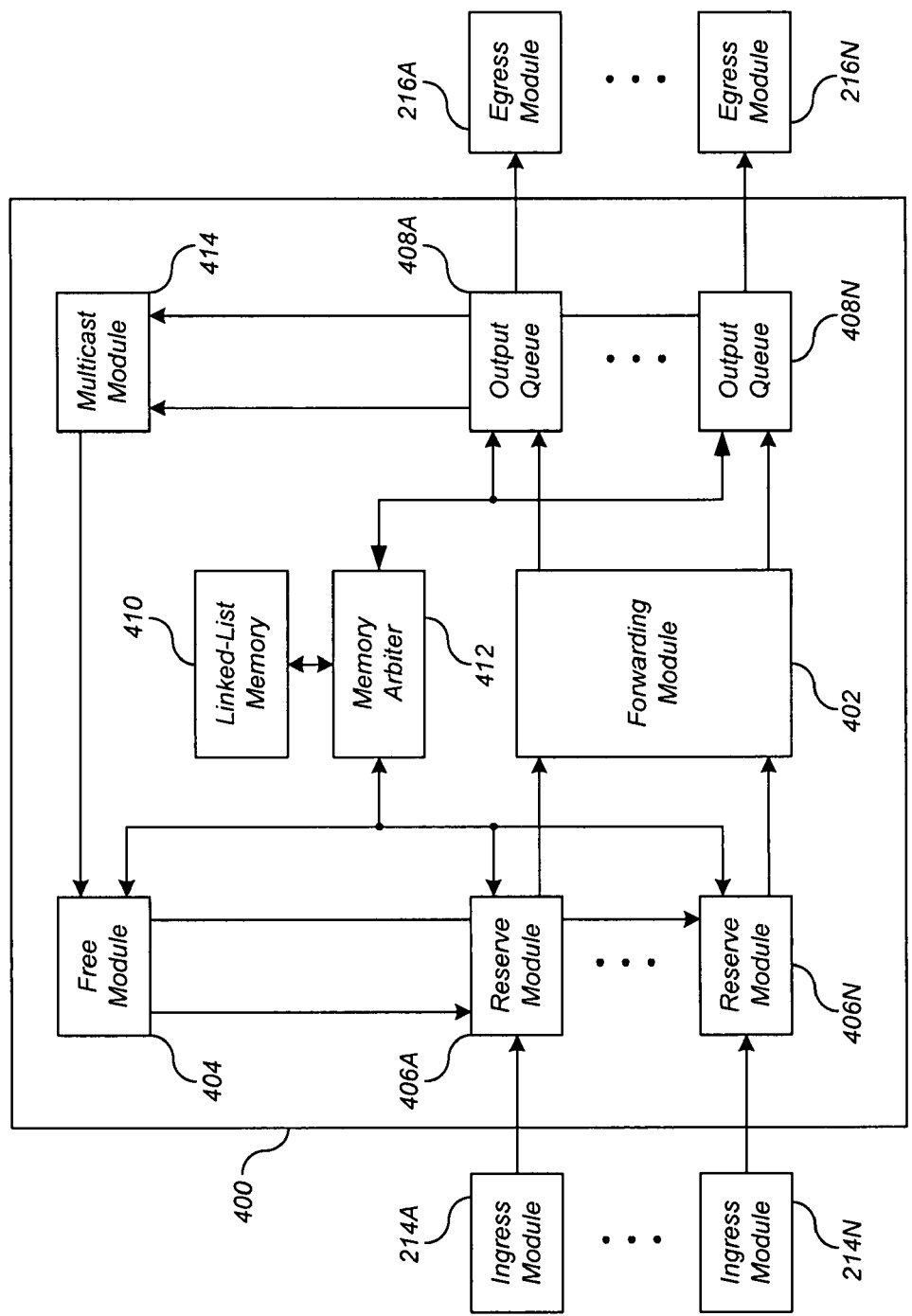
FIG. 4 is a block diagram of a queue controller suitable for use as the queue controller in the network switch of FIG. 2.

FIG. 4 is a block diagram of a queue controller 400 suitable for use as queue controller 206 in network switch 200 of FIG. 2. Queue controller 400 can be implemented using hardware, software, or any combination thereof. Queue controller 400 includes a forwarding module 402, a free module 404, a plurality of reserve modules 406A through 406N, and a plurality of output queues 408A through 408N. Each reserve module 406 is connected to one of ingress modules 214. Each output queue 408 is connected to one of egress modules 216.

Free module 404 and reserve modules 406 are each contain one linked list of pointers to buffers in shared memory 208. Each output queue 408 contains a priority queue for each class of service implemented by switch 400. Each priority queue contains one linked list of pointers to buffers in shared memory 208. In one implementation, switch 400 implements four classes of service labeled class 0 through class 3, with class 3 having the highest priority. In this implementation, each output queue 408 contains four priority queues. Other implementations can implement fewer or greater classes of service, as will be apparent to one skilled in the relevant art after reading this description.

All of the linked lists for free module 404, reserve modules 406, and output queues 408 are stored in a linked-list memory 410. A memory arbiter 412 arbitrates among competing requests to read and write linked-list memory 410. Each of free module 404, reserve modules 406, and output queues 408 maintains an object that describes its linked list. Each of these objects maintains the size of the list and pointers to the head and tail of the list. Each of free module 404, reserve modules 406, and output queues 408 traverses its linked list by reading and writing the "next" links into and out of linked list memory 410.

Figure 5:
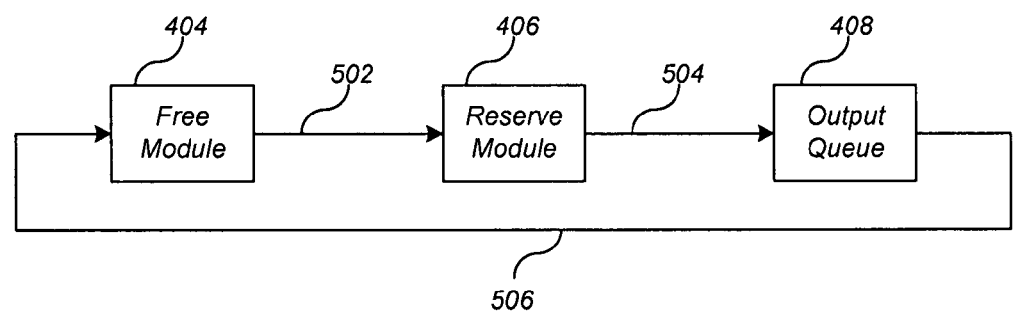
FIG. 5 depicts the manner in which pointers to buffers circulate within queue controller.

Free module 404 contains pointers to buffers in memory 208 that are available to store newly-received frames (that is, the buffers have an available status). Each reserve module 406 contains a list of pointers to available buffers that are reserved for the port housing that reserve module. FIG. 5 depicts the manner in which these pointers circulate within queue controller 400. Queue controller 400 allocates pointers from free module 404 to reserve modules 406 according to the methods described below (flow 502). Buffers associated with pointers in a free module 404 have an available status until a frame is stored in the buffers. Storing a frame in one or more buffers changes the status of those buffers to unavailable. To forward a frame to an output port, the frame is stored in a buffer in memory 208, and the pointers to that buffer are transferred to the output queue 408 for that output port (flow 504). When a frame is sent from an output port to a channel 106, the pointers for that frame are returned to free module 404, thereby changing the status of the pointers to available (flow 506).

Multicast module 414 handles multicast operations. In linked-list memory 410, pointers associated with the start of a frame also have a vector including a bit for each destined output port for the frame. When an output port finishes transmitting a frame, the output queue passes the frame's pointers to multicast module 414, which clears the bit in the destination vector associated with that output port. When all of the bits in the destination vector have been cleared, the frame's pointers are returned to free module 404.

Figure 6A:
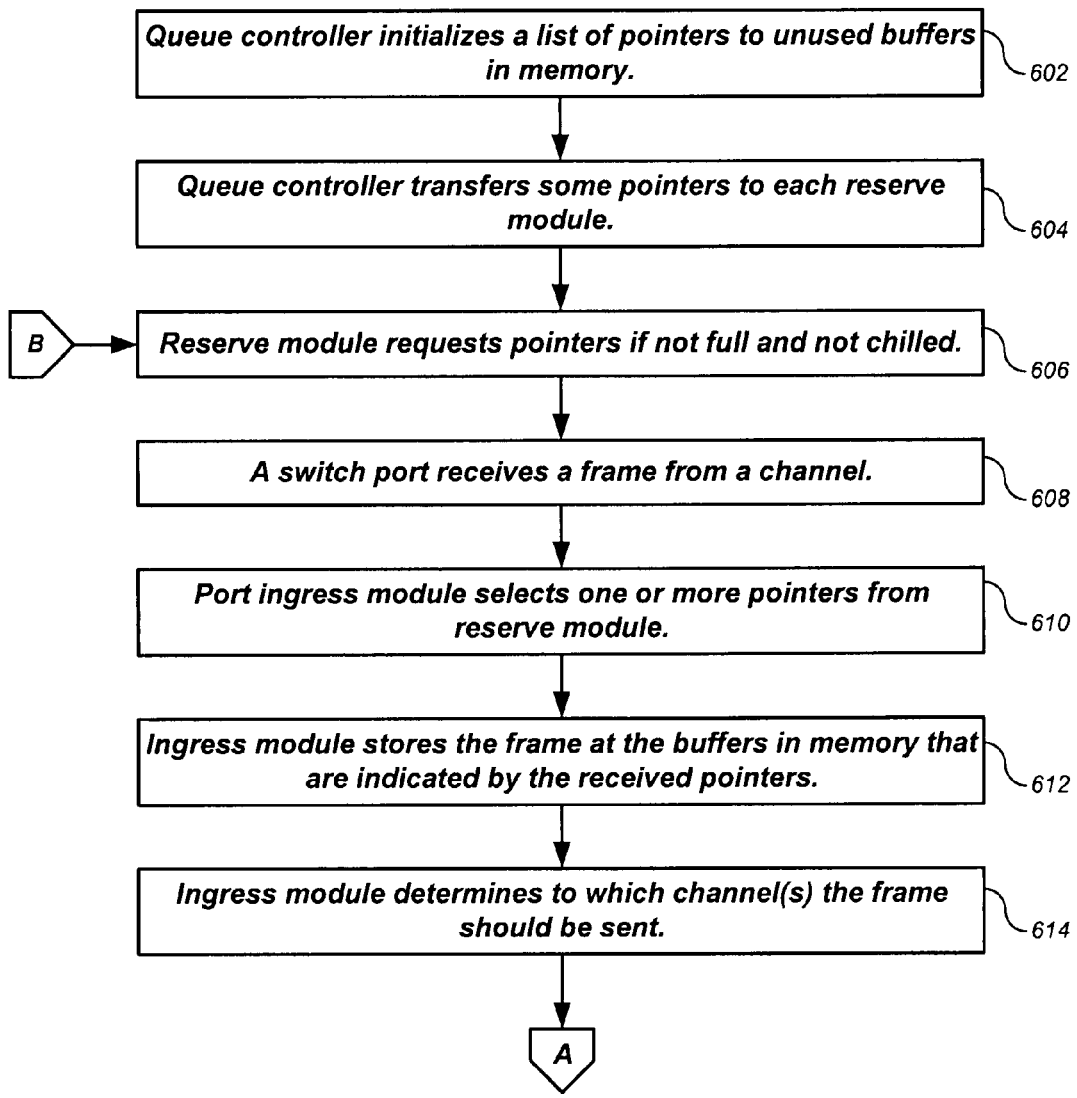
FIGS. 6A and 6B show a flowchart of a process of a network switch such as the network switch of FIG. 2 under the control of the queue controller of FIG. 4 according to an implementation having flow control enabled.
Figure 6B:
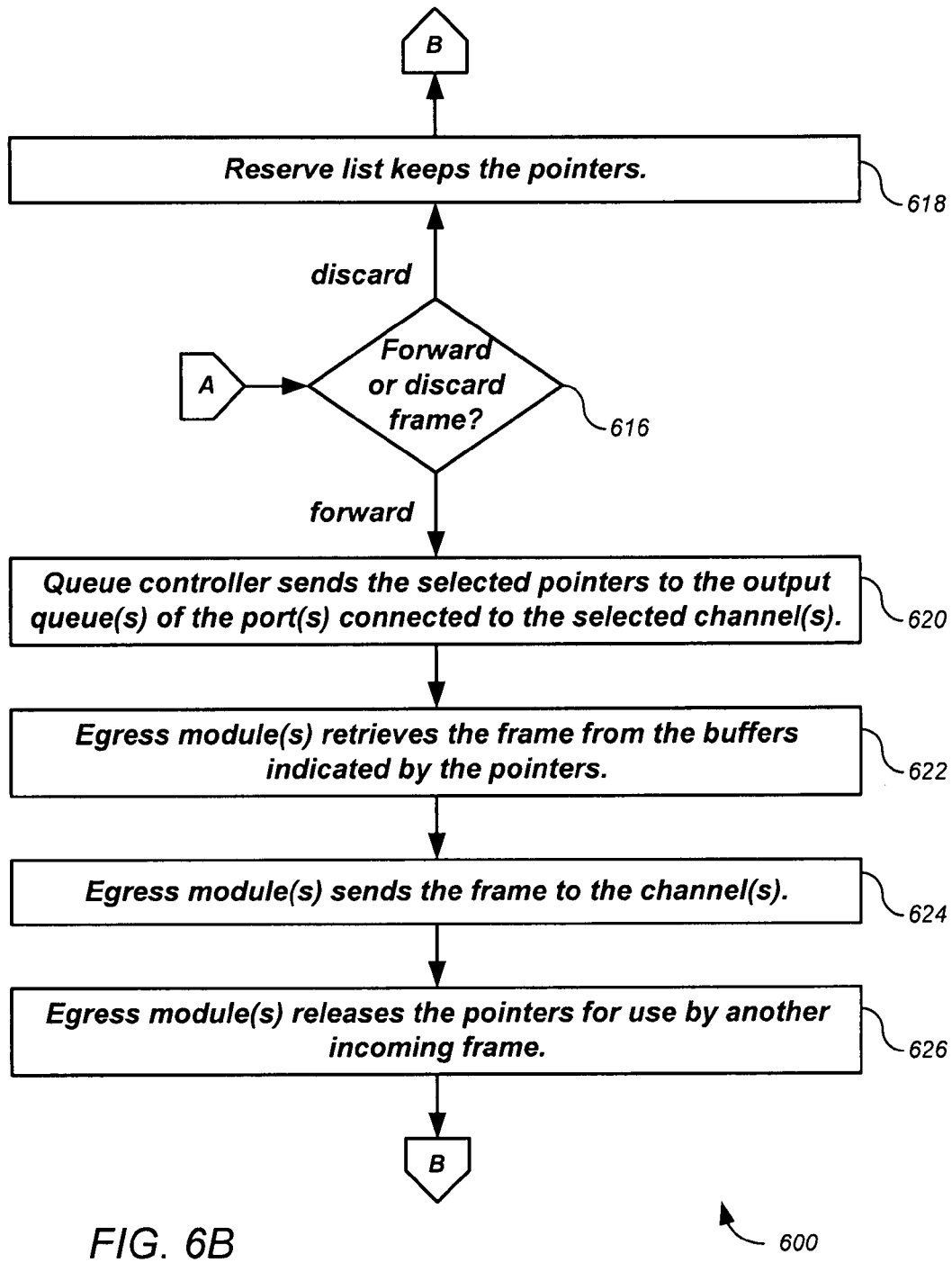

FIGS. 6A and 6B show a flowchart of a process 600 of a network switch such as switch 200 under control of queue controller 400 according to an implementation having flow control disabled, where the decision to forward or discard a frame is based only on the number of pointers in the reserve module 406 of the port 202 that received the frame. At power-on of switch 200, queue controller 400 initializes a free module 404 to contain a number of pointers to unused buffers in memory 208 (step 602). Queue controller 400 transfers some of these pointers to each reserve module (step 604). For example, queue controller 400 transfers a number of these pointers to a reserve module 314.

Each reserve module 406 includes a counter to count the number of pointers in the reserve module. When the number of pointers is below the capacity of the reserve module 406, the reserve module continually requests pointers from free module 404 (step 606) unless the reserve module is in a "chill" state. A reserve module 406 enters the "chill" state when its flow is congested, as described in detail below. In the chill state, the reserve module stops requesting pointers, even when the number of pointers q reserved by the reserve module is less than the capacity r of the reserve module. When some reserve modules 406 are chilled, free module 404 can serve every request from reserve modules 406 that are not chilled.

A port 202 of switch 200 receives a frame from a channel 204 (step 608). The frame enters the port 202 connected to the channel 204 and traverses the PHY 210 and MAC 212 of the port 202 to reach the ingress module 214 of the port 202. Ingress module 214 selects one or more pointers from the reserve module 406 for the port 202 (step 610). Ingress module 214 stores the frame in memory 208 at the buffers that are indicated by the received pointers (step 612).

Ingress module 214 then determines to which channel (or channels in the case of a multicast operation) the frame should be sent, according to methods well-known in the relevant arts (step 614). Reserve module 406 then determines whether the frame should be forwarded or discarded based on the number of pointers in the reserve module 406 of the port 202 that received the frame (step 616).

Each reserve module 406 also implements a predetermined threshold for each class of service. A reserve module 406 drops a frame having a particular class of service when the number of pointers is less than the predetermined threshold for that class of service. When a frame is dropped, the reserve module 406 keeps the pointers for that frame (step 618), and process 600 resumes at step 606.

A reserve module 406 forwards a frame having a particular class of service when the number of pointers is equal to, or greater than, the predetermined threshold for that class of service. Queue controller 206 sends the selected pointers to the output queues 408 for the ports connected to the selected channels (step 620). When the pointers for the frame reach the head of an output queue 408 of a port 202, the egress module 216 of the port retrieves the frame from the buffers indicated by the pointers (step 622) and sends the frame to their respective channels 204 (step 624). The output queue 408 then releases the pointers by returning them to free module 404 (step 626), and process 600 resumes at step 606.

An example of process 600 is now discussed with reference to FIG. 1. Device 104A has data to transmit to device 104B. Device 104A generates a frame of the data, and selects device 104B as the destination for the frame. Device 104A then sends the frame to channel 106A. The frame subsequently arrives at switch 102.

Switch 102 has a memory including a plurality of memory buffers m for storing a frame. The buffers include n available buffers and p unavailable buffers such that m=n+p. Switch 102 reserves q of the n buffers for channel 106A by sending q pointers to the reserve module for channel 106A. Switch 102 also reserves some of the remaining available buffers to other channels. When switch 102 receives the frame from channel 106A, it stores the frame in i of the q buffers, wherein $1 \leq i \leq q$, thereby changing the status of the i buffers to unavailable. In one implementation, $1 \leq i \leq 3$.

Switch 102 selectively assigns the frame to channel 106B (that is, determines whether to send the frame to channel 106B) based on a number s of the q buffers reserved to the first channel. In one implementation, the number s includes the number of buffers i used to store the frame, so s=q. In another implementation, the number s does not include the number of buffers i used to store the frame, so s=q−i.

If the number of buffers s is greater than or equal to the predetermined threshold for the class of service for the frame, switch 102 sends the frame to channel 106B and changes the status of the i buffers to available. Device 104B then receives the frame. But if the number of buffers s is less than the predetermined threshold for the class of service for the frame, switch 102 discards the frame and changes the status of the i buffers to available.

Figure 7:
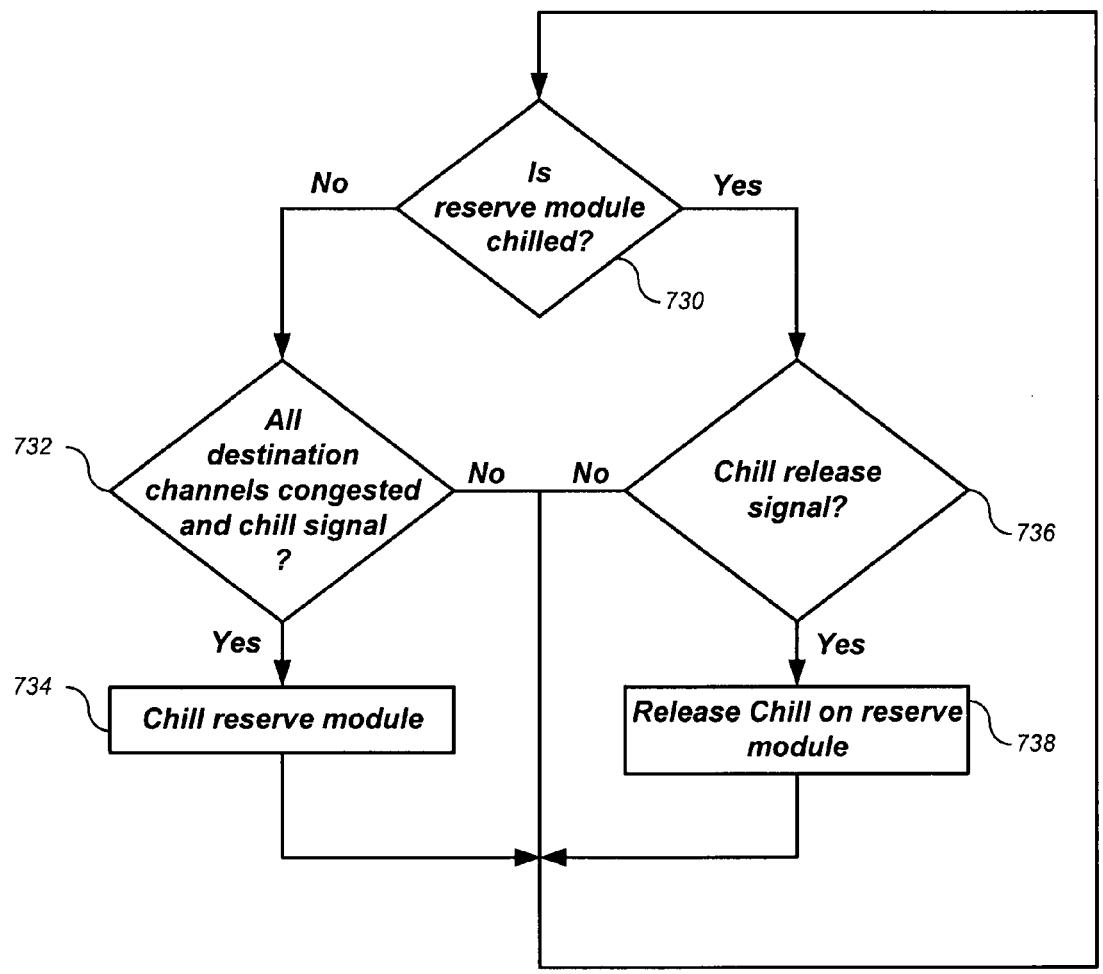
FIG. 7 shows a flowchart of a process of a network switch, such as the switch of FIG. 2 under control of the queue controller of FIG. 4, for allocating pointers to reserve modules according to one implementation.

FIG. 7 shows a flowchart of a process 700 of a network switch, such as switch 200 under control of queue controller 400, for allocating pointers to reserve modules 406 according to one implementation. In some implementations, process 700 executes concurrently with process 600 to allocate pointers to reserve modules 406. A reserve module 406 determines whether it should be in the chill state, in part according to the number h of pointers in free module 404. In some implementations, free module 404 employs a single predetermined threshold, asserting a "chill" signal when the number h of pointers in the free module falls below the threshold. Other implementations employ hysteresis through the use of multiple thresholds. For example, process 700 employs two thresholds: a chill threshold Tc and a chill release threshold Tr, where Tr>Tc. When the number h of pointers in free module 404 is less than, or equal to, the chill threshold (h≦Tc), free module asserts a "chill" signal. When the number h of pointers in free module 404 is greater than, or equal to, the chill release threshold (h≧Tr), free module asserts a "chill release" signal.

It is important to ensure that once a reserve module 406 enters the chill state, that it is possible for the reserve module to exit the chill state. To satisfy this condition, the chill release threshold Tr for a switch is chosen by considering the capacity r of a reserve module 406, the total number of pointers t available, and the number of ports p in the switch, such that $$Tr \leq t - r \cdot p \quad (1)$$

In one implementation, p=7, t=240, Tr=28, Tc=12 and r=27.

Figure 14:
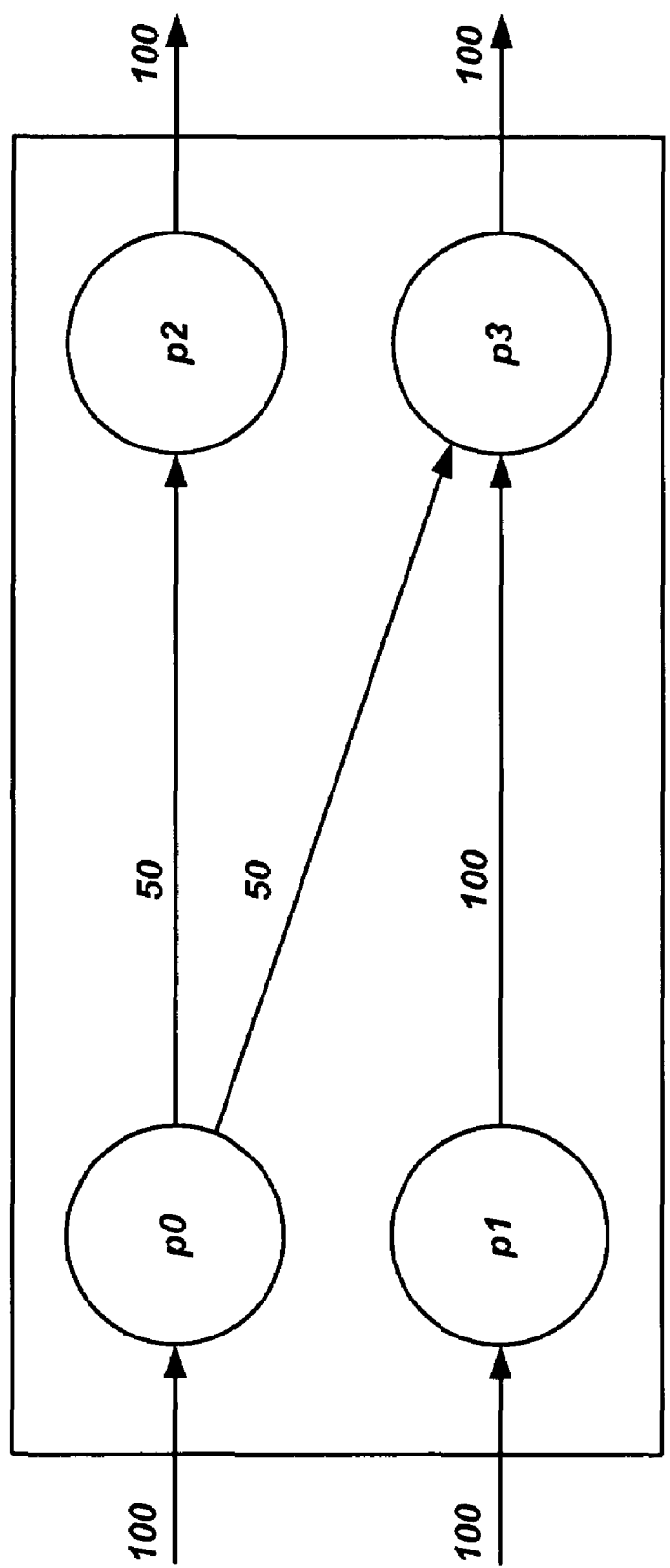
FIG. 14 shows four ports p0, p1, p2, and p3 in a switch to illustrate head-of-line blocking.

Implementations that employ hysteresis, such as the implementation of process 700, must first determine whether reserve module 406 is currently in the chill state (step 730). If not, then process 700 determines whether reserve module 406 should be chilled (step 732). Process 700 determines whether free module 404 is asserting a "chill" signal. Process 700 also examines the destination port vector of the last frame received by the port 202 served by the reserve module 406 to determine whether any of those destination ports are uncongested. The process of determining whether a destination port is congested is described in detail below with reference to FIG. 14. If any of those destination ports is uncongested, and the reserve module 406 entered the chill state, the flow from the port 202 served by the reserve module 406 to the uncongested destination port would eventually drop frames. Therefore, reserve module 406 chills (step 734) only when free module 404 is asserting a "chill" signal, and all of the destination ports for the last frame received and stored by the port 202 served by the reserve module are uncongested; then process 700 resumes at step 702. Otherwise process 700 resumes at step 702.

If in step 730 process 700 determines that reserve module 406 is in the chill state, then process 700 determines whether the chill state should be released (step 736). Process 700 determines whether free module 404 is asserting a "chill release" signal. If so, reserve module 406 exits the chill state (step 738), and process 700 resumes at step 702. Otherwise process 700 resumes at step 702.

By suspending pointer requests for congested flows, process 700 provides more pointers, and thus greater bandwidth, to uncongested flows in the switch. Further, by gradually discarding frames based on class of service as the switch becomes more congested, process 700 effectively reserves more free buffers for frames having high classes of service. Therefore, process 700 serves to minimize the ingress latency for high-priority frames, in accordance with the objectives of quality of service.

Table 2 shows the thresholds, and their effects on each class of service, according to one implementation. In Table 2, the number of pointers in the reserve module is denoted as "size."

TABLE 2

| size | class of service 0 | class of service 1 | class of service 2 | class of service 3 |
|---|---|---|---|---|
| 18-27 | forward frame | forward frame | forward frame | forward frame |
| 13-17 | discard frame | forward frame | forward frame | forward frame |
| 8-12 | discard frame | discard frame | forward frame | forward frame |
| 3-7 | discard frame | discard frame | discard frame | forward frame |
| 0-2 | discard frame | discard frame | discard frame | discard frame |

Figure 8:
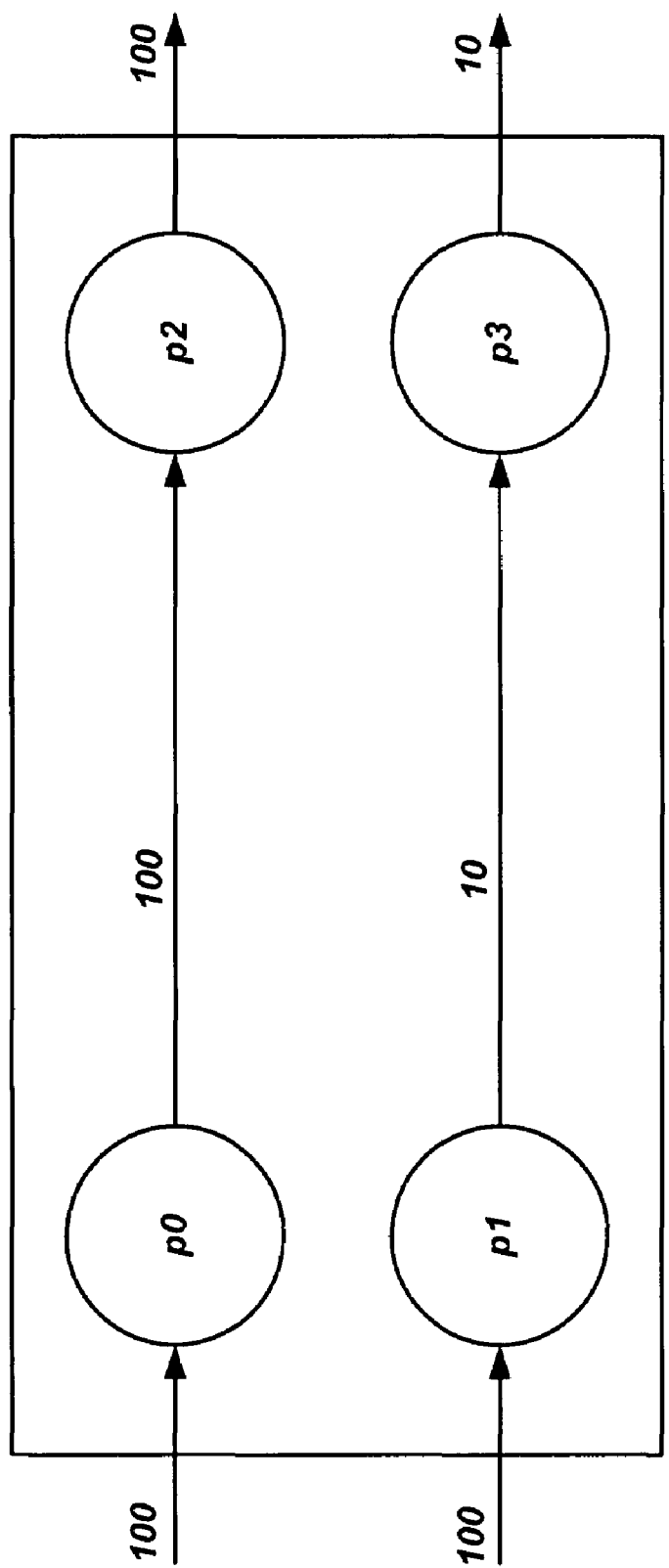
FIG. 8 shows a parallel blocking case.

Implementations of the invention not using flow control solve a problem referred to herein as "parallel blocking". Parallel blocking occurs when a congested flow in a switch causes frames to be dropped from an uncongested flow, even though the two flows have no ports in common. FIG. 8 depicts a parallel blocking case, referred to herein as "mixed-speed, parallel flows." This case is depicted for a switch having flow control disabled, where one of the output ports p3 runs at 10 Mbps, while each of the remaining ports p0, p1 and p2 run at 100 Mbps. For clarity of explanation, it is assumed that all of the frames handled by the switch have the same class of service. However, parallel blocking is a problem with multiple classes of service as well.

Port p0 sends all of its frames to port p2. Both ports p0 and p2 run at 100 Mbps; therefore in the ideal scenario, no frames are dropped on the flow from port p0 to port p2. Port p1 sends all of its frames to port p3. However, port p1 runs at 100 Mbps, while port p3 runs at only 10 Mbps; therefore in the ideal scenario, 90% of the frames are dropped on the flow from port p1 to port p3. However, these ideal scenarios may not be achieved for the reasons discussed below.

Each reserve module 406 reserves a variable number of pointers q for its port 202, up to a maximum number of pointers r, where q≦r. As a port 202 receives and stores frames, the number of pointers q in its reserve module 406 diminishes. When the number of pointers q reserved by a reserve module 406 is less than the capacity r of the reserve module (q<r), the reserve module requests additional pointers from free module 404. If free module 404 has an available pointer, it will transmit that pointer to the requesting reserve module 406.

Referring again to FIG. 8, assuming both ports p0 and p1 have the same priority, free module 404 alternately transmits pointers to the reserve modules for ports p0 and p1. Because the size of the output queues 408 is not limited (except by the size of linked-list memory 410), eventually the congestion at port p3 causes free module 404 to drain until no pointers remain in the free module. When free module 404 is empty, it can no longer transmit pointers to the reserve modules 406.

If frames continue to arrive at ports p0 and p1 at full rate while free module 404 is unable to replenish at full rate the pointers in the reserve modules 406 for those ports, the number of pointers in each reserve module will diminish until they fall below their respective forward/discard thresholds. When this happens, both ports p0 and p1 will begin dropping frames due to the congestion in the flow from port p1 to port p3, even though the flow from port p0 to port p2 is uncongested.

Process 600 solves this problem. In process 600, a reserve module 406 enters the "chill" state when its flow is congested. In the chill state, the reserve module stops requesting pointers, even when the number of pointers q reserved by the reserve module is less than the capacity r of the reserve module (q<r). When reserve modules 406 for congested flows are chilled, free module 404 can serve every request from reserve modules 406 for uncongested flows.

Referring to FIG. 8, under process 600 the congestion at port p3 causes the reserve module 406 serving port p1 to chill; the reserve module 406 serving port p1 then no longer requests pointers from free module 404. The number of pointers in the reserve module 406 for port p1 decreases, eventually causing port p1 to drop frames until the congestion at port p3 eases. Eventually conditions stabilize at the ideal scenario, where no frames are dropped on the flow from port p0 to port p2, and 90% of the frames are dropped on the flow from port p1 to port p3.

Figure 9:
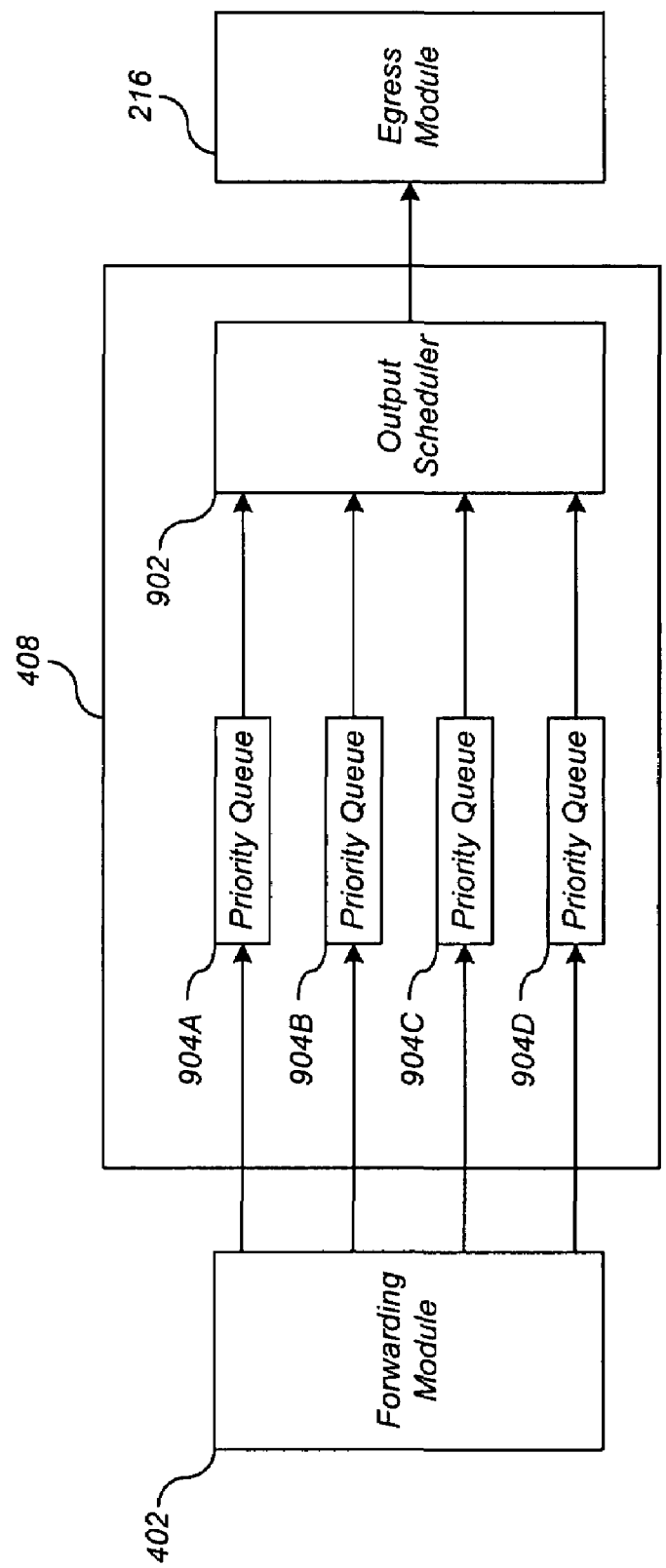
FIG. 9 is a block diagram of an output queue according to one implementation.

FIG. 9 is a block diagram of an output queue 408 according to one implementation. Output queue 408 includes an output scheduler 902 and four priority queues 904A, 904B, 904C, and 904D assigned to classes of service 3, 2, 1, and 0, respectively. Forwarding module 402 enqueues the pointers for each frame to a priority queue selected according to the class of service of the frame. For example, the pointers for a frame having class of service 2 are enqueued to priority queue 904B. Each egress module 216 can transmit only one frame at a time. Therefore output scheduler 902 selects one of the priority queues at a time based on a priority scheme that can be predetermined or selected by a user of the switch, such as a network administrator.

One priority scheme is strict priority. According to strict priority, higher-priority frames are always handled before lower-priority frames. Under this scheme, priority queue 904A transmits until it empties. Then priority queue 904B transmits until it empties, and so on.

Another priority scheme is weighted fair queuing. According to weighted fair queuing, frames are processed so that over time, higher-priority frames are transmitted more often than lower-priority frames according to a predetermined weighting scheme and sequence. One weighting scheme for four classes of service is "8-4-2-1." Of course, other weighting schemes can be used, as will be apparent to one skilled in the relevant art after reading this description.

According to 8-4-2-1 weighting, in 15 consecutive time units, 8 time units are allocated to class of service 3, 4 time units are allocated to class of service 2, 2 time units are allocated to class of service 1, and 1 time unit is allocated to class of service 0. In one implementation, the sequence shown in Table 1 is used with 8-4-2-1 weighting.

TABLE 1

| Time Unit | 1 2 3 4 5 6 7 8 9 10 11 12 13 14 15 |
|---|---|
| Priority | 3 2 3 1 3 2 3 0 3 2 3 1 3 2 3 |

Thus when none of the priority queues are empty, the sequence of classes of service selected by output scheduler 902 is 3-2-3-1-3-2-3-0-3-2-3-1-3-2-3. When one of the priority queues is empty, its slots in the sequence are skipped. For example, if only priority queue 904A is empty, the sequence of classes of service output scheduler 902 is 2-1-2-0-2-1-2.

Free module 404 also employs a priority scheme in satisfying requests for pointers from reserve modules 406. In one implementation, free module 404 employs strict priority in satisfying these requests. In another implementation, free module 404 employs weighted fair queuing in satisfying these requests.

Figure 10:
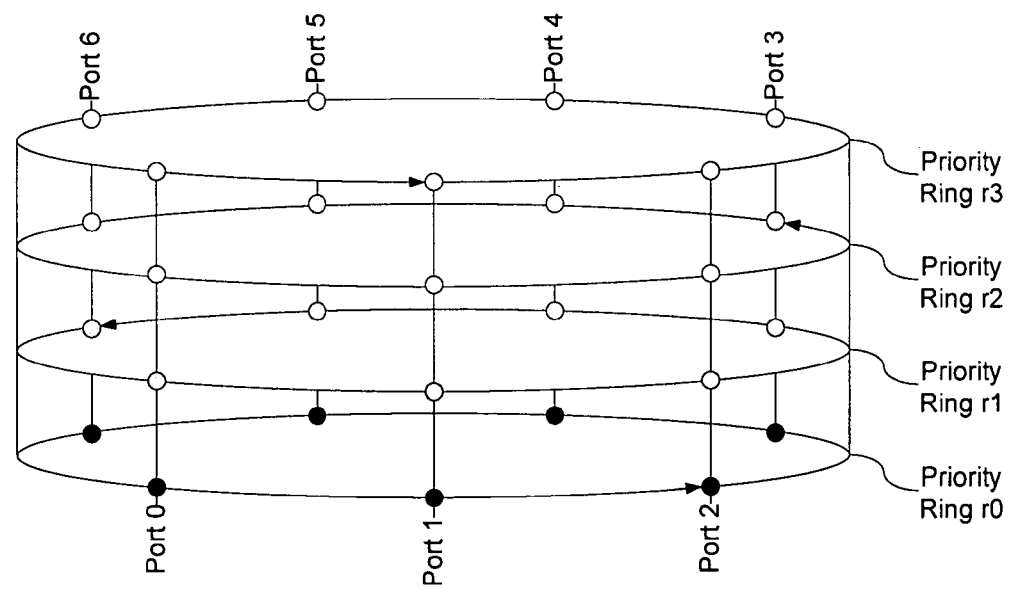
FIG. 10 depicts the logical structure of the process employed by a free module in allocating pointers to ports according to an implementation having 7 ports and 4 classes of service.

FIG. 10 depicts the logical structure 1000 of the process employed by free module 404 in allocating pointers to ports according to an implementation having 7 ports and 4 classes of service. Each class of service has a ring. Class of service 0 has a ring r0. Class of service 1 has a ring r1. Class of service 2 has a ring r2. Class of service 3 has a ring r3. Each port has a station on each ring.

Although storing a frame may require multiple buffers, and therefore multiple pointers, free module 404 dispenses pointers to reserve modules 406 one at a time to keep allocation of the pointers both simple and fair. When a reserve module 406 is not full, it requests a pointer. The request includes a priority. In one implementation, the priority is the class of service of the last frame received by the port. In another implementation, the priority is the class of service of the last frame forwarded by the port.

Free module 404 first allocates the requests to the stations on structure 1000, and then selects one of the rings to examine using a priority scheme such as weighted fair queuing. Within that ring, free module 404 selects a request by selecting one of the stations on the ring. Free module 404 remembers the last station serviced on each ring, and services the next one so that all stations on a ring are serviced sequentially. If a station has no request for pointers, free module 404 moves on to the next station on the ring. When a pointer has been dispensed to a station on a ring, free module 404 selects another ring according to the priority scheme. When no requests are pending, neither the priority sequence nor the sequential sequence advances. This process ensures that, within a single class of service, requests for free pointers are serviced evenly in a sequential fashion, and that between classes of service, requests for free pointers are serviced according to class of service. As a result, when the switch is congested, ports that receive and forward high-priority frames receive more free pointers. The sizes of the reserves lists for those ports do not decrease as rapidly as those of ports receiving low-priority frames. Therefore, over time, high-priority frames experience less latency than low-priority frames. When flow control is enabled, and the switch is congested, this process ensures that ports receiving high-priority frames assert flow control less often, and therefore handle more frames. Thus even with flow control enabled, the process implements quality of service.

When a reserve module 406 is not in the chill state, the reserve module asserts a request for pointers from free module 404 until the request is serviced (that is, until the reserve module receives a pointer from the free module). But when a reserve module 406 enters the chill state, and the reserve module has a pending request for pointers (that is, the reserve module has asserted a request for pointers that has not been serviced), it drops the request.

In some implementations, free module 404 handles dropped requests as follows. When a request is dropped while free module 404 is servicing that request, the free module attempts to service another request on the same priority ring r as the dropped request. If there is no request pending on that priority ring r, free module 404 waits until a request is placed on that priority ring, and services that request. Thus when a request is dropped while free module 404 is servicing that request, free module 404 does not move on to the next priority ring until a request has been serviced on the current priority ring.

In other implementations, free module 404 handles dropped requests as follows. When a request is dropped while free module 404 is servicing that request, the free module moves on to the next priority ring r in the selected priority scheme, and otherwise continues to operate as described above with reference to FIG. 8. In addition, the chill threshold Tc and chill release threshold Tr are selected such that $$Tr-Tc \geq 2^p \qquad (2)$$

where p is the number of classes of service handled by the switch. This ensures that, in a weighted fair queueing scheme, every port is serviced at least once between chill states. And because free module 404 does not wait within a priority ring r for requests, uncongested flows are not blocked.

In some implementations queue controller 400 implements quality of service when flow control is disabled. When flow control is disabled, switch 200 can refuse to store and forward frames. This refusal is also known as "discarding" frames or "dropping" frames. A frame is forwarded by enqueuing the pointers for that frame to an output queue. A frame is discarded by not enqueuing the pointers for that frame to an output queue, but instead keeping those pointers in the reserve module 406. In a multicast operation, where a frame is destined for multiple output queues, that frame may be enqueued to some of the output ports, but not enqueued to others of the output ports, as described below. When a switch discards a frame, some protocols at higher layers, such as transmission control protocol (TCP) detect and retransmit the discarded frame, while other protocols at higher layers, such as user datagram protocol (UDP), take no action.

In one implementation the decision to forward or discard a frame is based only on the number of pointers in the reserve module 406 of the port 202 that received the frame. In another implementation, this decision is based not only on the number of pointers in the reserve module 406 of the port 202 that received the frame, but also on the level of congestion on the channel to which the frame should be forwarded.

Figure 11A:
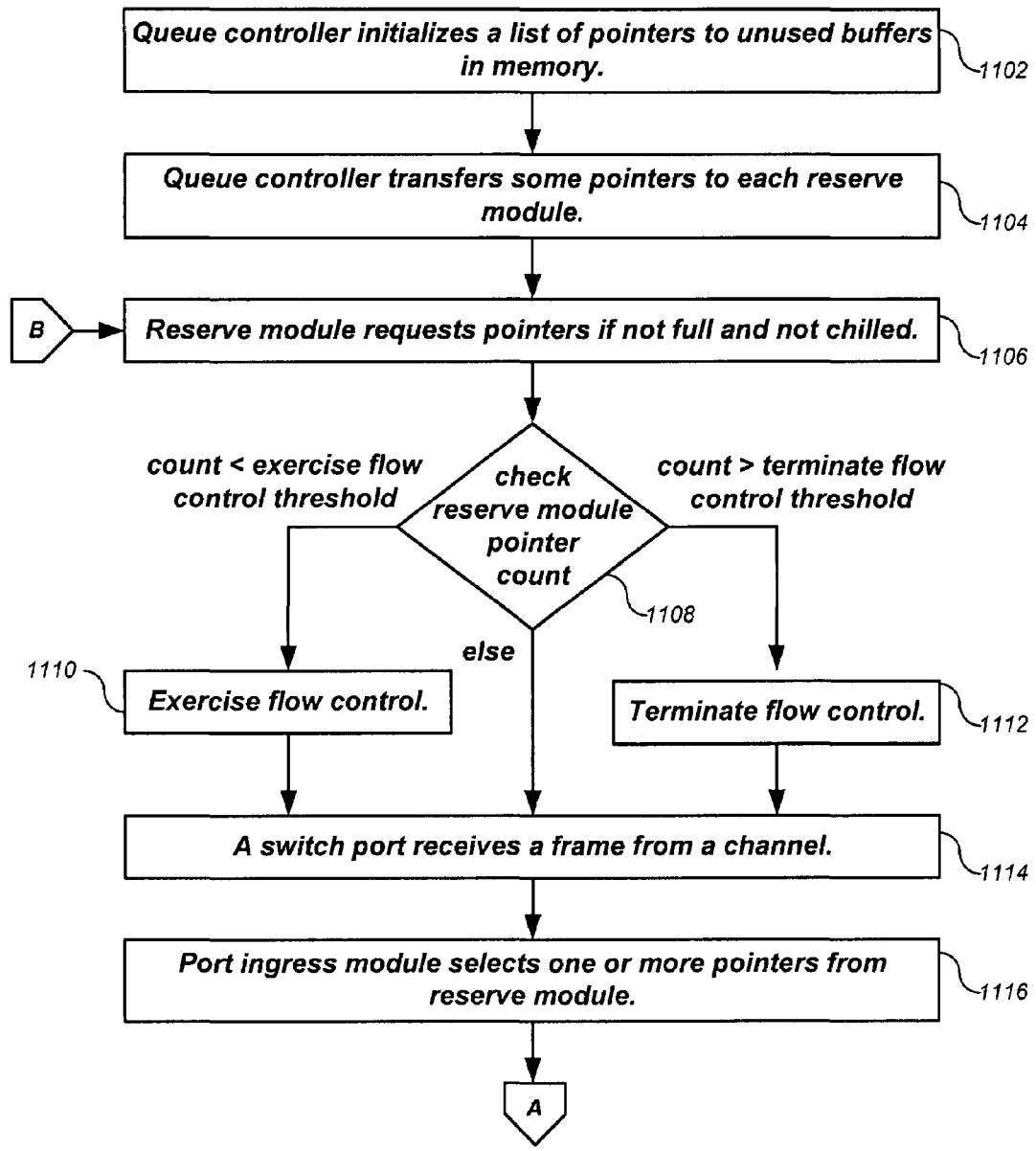
FIGS. 11A and 11B show a flowchart of a process of a network switch under control of a queue controller according to an implementation having flow control disabled, where the decision to forward or discard a frame is based only on the number of pointers in the reserve module of the port that received the frame.
Figure 11B:
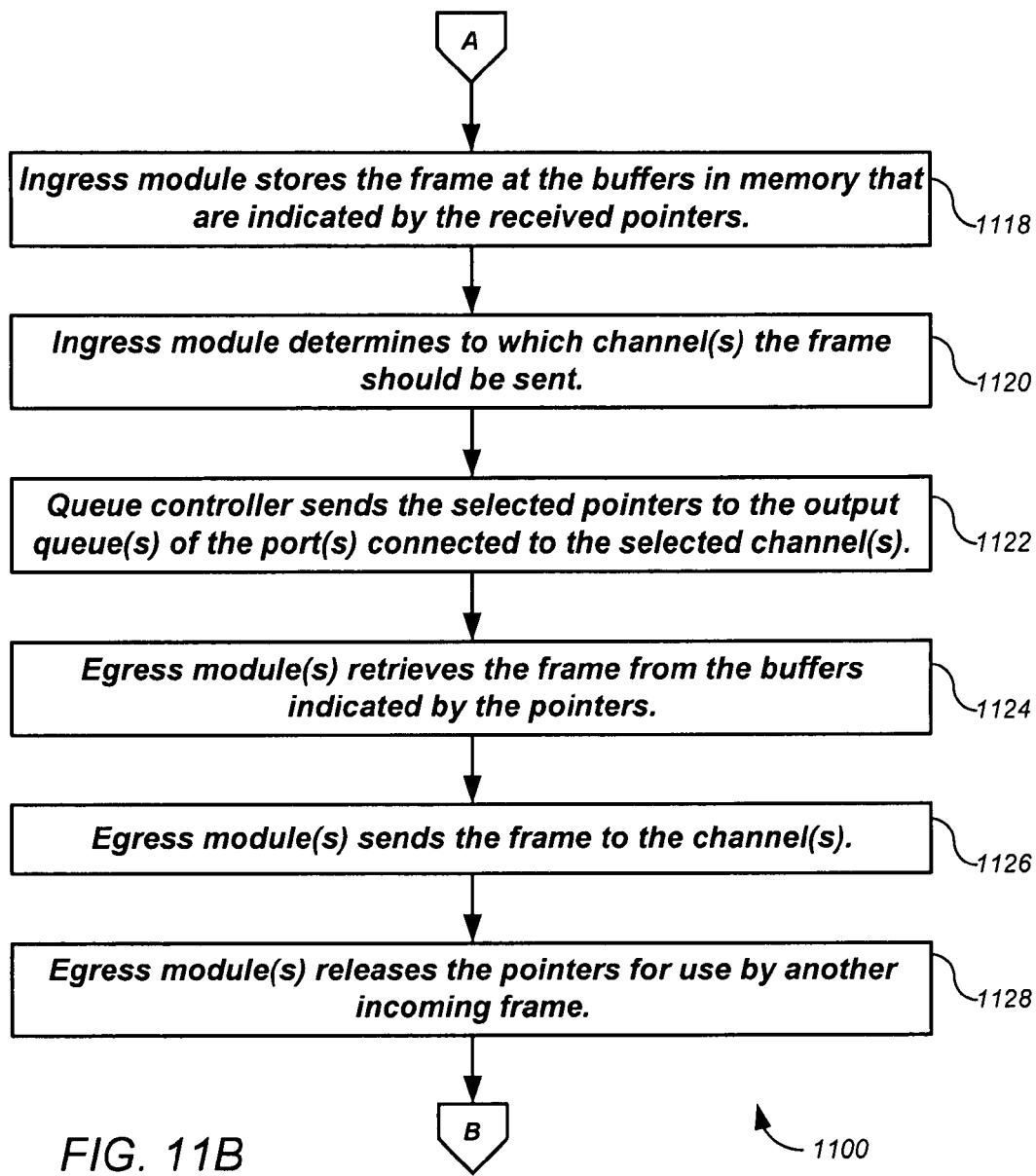

FIGS. 11A, and 11B show a flowchart of a process 1100 of a network switch such as switch 200 under the control of queue controller 400 according to an implementation having flow control enabled. When flow control is enabled, switch 200 must store and forward all of the frames it receives; it cannot discard any frames. At power-on of switch 200, queue controller 400 initializes free module 404 to contain a number of pointers to unused buffers in memory 208 (step 1102). Each port waits until the link goes up for its channel, and its port state is enabled, before requesting pointers from free module 404. Queue controller 400 transfers some of these pointers to each reserve module (step 1104). For example, queue controller 400 transfers a number of these pointers to a reserve module 314. When a port's link goes down, or its port state is disabled, the port's reserve module returns all of its pointers to free module 404, thereby maximizing buffer availability for the other ports. The port then idles until its link is up and its port state is enabled.

Each reserve module 406 includes a counter to count the number of pointers in the reserve module. When the number of pointers is below the capacity of the reserve module 406, the reserve module continually requests pointers from free module 404 (step 1106) unless the reserve module is in the "chill" state. A reserve module 406 enters the "chill" state when its flow is congested, as described in detail below. In the chill state, the reserve module stops requesting pointers, even when the number of pointers q reserved by the reserve module is less than the capacity r of the reserve module. When reserve modules 406 for congested flows are chilled, free module 404 can serve every request from reserve modules 406 for uncongested flows.

Each port 202 exercises flow control on its link based on the count of pointers in its reserve module 406. When the count of pointers in the reserve module 406 of a port 202 falls below an exercise flow control threshold (step 1108), the port exercises flow control on its channel 204 (step 1110). This reduces or eliminates traffic from the other devices on the channel 204 bound for switch 200, which eases congestion within the switch, thereby increasing the number of pointers in free module 404, and consequently increasing the number of pointers in reserve modules 406. When the count of pointers in the reserve module 406 of a port 202 rises above a terminate flow control threshold (step 1108), the port terminates flow control on its channel 204 (step 1112). This allows the level of traffic from other devices on the channel 204 bound for switch 200 to increase.

In an implementation where a port 202 is connected to a full-duplex channel, the port 204 exercises flow control on the channel by sending a "pause" frame to the channel, and releases flow control by sending a "pause release" frame to the channel, in accordance with the IEEE 802.3 standard. In an implementation where a port 202 is connected to a half-duplex channel, the port 204 exercises and terminates flow control on the channel by other well-known methods such as forced collisions or carrier sense assertion.

In one implementation, the capacity r of each reserve module 406 is 28 pointers, the count runs from 0 to 28, the exercise flow control threshold is 18, and the terminate flow control threshold is 28.

A port 202 of switch 200 receives a frame from a channel 204 (step 1114). The frame enters the port 202 connected to the channel 204 and traverses the PHY 210 and MAC 212 of the port 202 to reach the ingress module 214 of the port 202. Ingress module 214 selects one or more pointers from the reserve module 406 for the port 202 (step 1116). Ingress module 214 stores the frame in memory 208 at the buffers that are indicated by the received pointers (step 1118).

Ingress module 214 then determines to which channel (or channels in the case of a multicast operation) the frame should be sent, according to methods well-known in the relevant arts (step 1120). Queue controller 206 sends the selected pointers to the output queues 408 of the ports connected to the selected channels (step 1122). In one implementation, forwarding module 402 does this by linking the pointers to the output queues 408 of the ports 202 connected to the selected channel. When the pointers for a frame reach the head of an output queue 408 of a port 202, the egress module 216 of that port then retrieves the frame from the buffers indicated by the pointers (step 1124) and sends the frame to its channel 204 (step 1126). The output queue 408 then releases the pointers by returning them to free module 404 (step 1128). Process 1100 resumes at step 1106.

In some implementations, process 700 executes concurrently with process 1100 to allocate pointers to reserve modules 406. Process 700 is described above with reference to FIG. 7.

An example of process 1000 is now discussed with reference to FIG. 1. Device 104A has data to transmit to device 104B. Device 104 generates a frame of the data, and selects device 104B as the destination for the frame. Device 104A then sends the frame to channel 106A. The frame subsequently arrives at switch 102.

Switch 102 has a memory including a plurality of memory buffers m for storing a frame. The buffers include n available buffers and p unavailable buffers such that m=n+p. Switch 102 reserves q of the n buffers for channel 106A by sending q pointers to the reserve module for channel 106A, where q<n. Switch 102 also reserves some of the remaining available buffers to other channels. When switch 102 receives the frame from channel 106A, it stores the frame in i of the q buffers, wherein $1 \leq i \leq q$, thereby changing the status of the i buffers to unavailable. In one implementation, $1 \leq i \leq 3$. Switch 102 then determines that the frame should be sent to channel 106B, and so sends the frame to channel 106B. Device 104B receives the frame.

Switch 102 exercises flow control over channel 106A based on a number s of the q buffers reserved to the first channel. In one implementation, the number s includes the number of buffers i used to store the frame, so s=q. In another implementation, the number s does not include the number of buffers i used to store the frame, so s=q−i.

Process 1100 implements flow control efficiently in an output-queued switch, and complies with the IEEE 802.3 standard for flow control. The IEEE 802.3 flow control standard was devised for input-queued switches, because in input-queued switches, it is clear that the channel causing congestion is the channel connected to that input queue. Output-queued switches are preferred to input-queued switches because they are simpler to design for low port-count switches. But in conventional output-queued switches, it is difficult to determine which channels are causing congestion in an output queue because it is difficult or impossible to determine the channel from which the frames in an output queue were received. One conventional solution is to simply exercise flow control over all of the channels connected to a switch whenever any output queue becomes congested. The reserve module mechanism described above solves this problem. When the number of buffers in a reserve module falls below the exercise flow control threshold, it is clear that the channel connected to that reserve module is causing congestion, and flow control is exercised only on that channel. Thus process 1100 provides efficient flow control in an output-queued switch.

Figure 12:
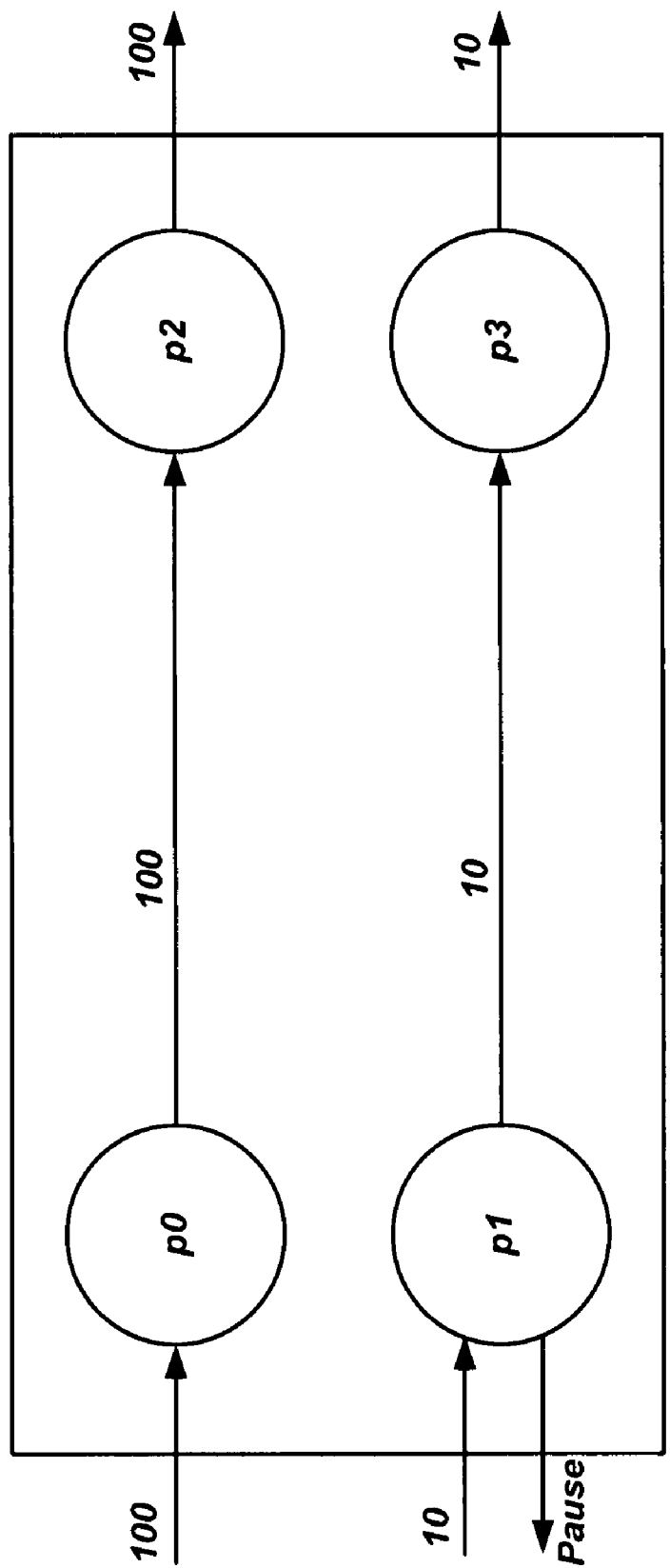
FIG. 12 shows a mixed-speed, parallel-flows, parallel blocking case.

Implementations of the invention using flow control solve the parallel blocking problem. FIG. 12 depicts a mixed-speed, parallel-flows, parallel blocking case. This case is depicted for a switch having flow control enabled, where one of the output ports p3 runs at 10 Mbps, while each of the remaining ports p0, p1 and p2 run at 100 Mbps. For clarity of explanation, it is assumed that all of the frames handled by the switch have the same class of service. However, parallel blocking is a problem with multiple classes of service as well.

Port p0 sends all of its frames to port p2. Both ports p0 and p2 run at 100 Mbps; therefore in the ideal scenario, no frames are dropped on the flow from port p0 to port p2. Port p1 sends all of its frames to port p3. However, port p1 runs at 100 Mbps, while port p3 runs at only 10 Mbps; therefore in the ideal scenario, port p1 exercises flow control with its link partner such that its data rate is reduced by 90% to 10 Mbps. However, these ideal scenarios may not be achieved for the reasons discussed below with reference to FIG. 4.

Each reserve module 406 reserves a variable number of pointers q for its port 202, up to a maximum number of pointers r, where $q \leq r$. As a port 202 receives and stores frames, the number of pointers in its reserve module 406 diminishes. When the number of pointers q reserved by a reserve module 406 is less than the capacity r of the reserve module (q<r), the reserve module requests additional pointers from free module 404. If free module 404 has an available pointer, it will transmit that pointer to the requesting reserve module 406.

Referring again to FIG. 12, assuming both ports p0 and p1 have the same priority, free module 404 alternately transmits pointers to the reserve modules for ports p0 and p1. Because the size of the output queues 408 is not limited (except by the size of linked-list memory 410), eventually the congestion at port p3 causes free module 404 to drain until no pointers remain in the free module. When free module 404 is empty, it can no longer transmit pointers to the reserve modules 406.

If frames continue to arrive at ports p0 and p1 at full rate while free module 406 is unable to replenish at full rate the pointers in the reserve modules for those ports, the number of pointers in the reserve modules will diminish until they fall below the exercise flow control threshold. When this happens, both ports p0 and p1 will exercise flow control with their respective link partners due to the congestion in the flow from port p1 to port p3, even though the flow from port p0 to port p2 is uncongested.

Process 1100 solves this problem. In process 1100, a reserve module 406 enters the "chill" state when its flow is congested. In the chill state, the reserve module stops requesting pointers, even when the number of pointers q reserved by the reserve module is less than the capacity r of the reserve module ($q \leq r$). When reserve modules 406 for congested flows are chilled, free module 404 can serve every request from reserve modules 406 for uncongested flows.

Referring to FIG. 12, under process 1100 the congestion at port p3 causes the reserve module 406 serving port p1 to chill; the reserve module 406 serving port p1 then no longer requests pointers from free module 404. This causes the number of pointers in the reserve module 406 serving port p1 to decrease until it falls below the exercise flow control threshold. Port p1 then exercises flow control with its link partner until the congestion at port p3 eases. Eventually conditions stabilize at the ideal scenario, where the flow from port p0 to port p2 runs at full rate, and the flow from port p1 to port p3 runs at %10 of full rate.

Figure 13:
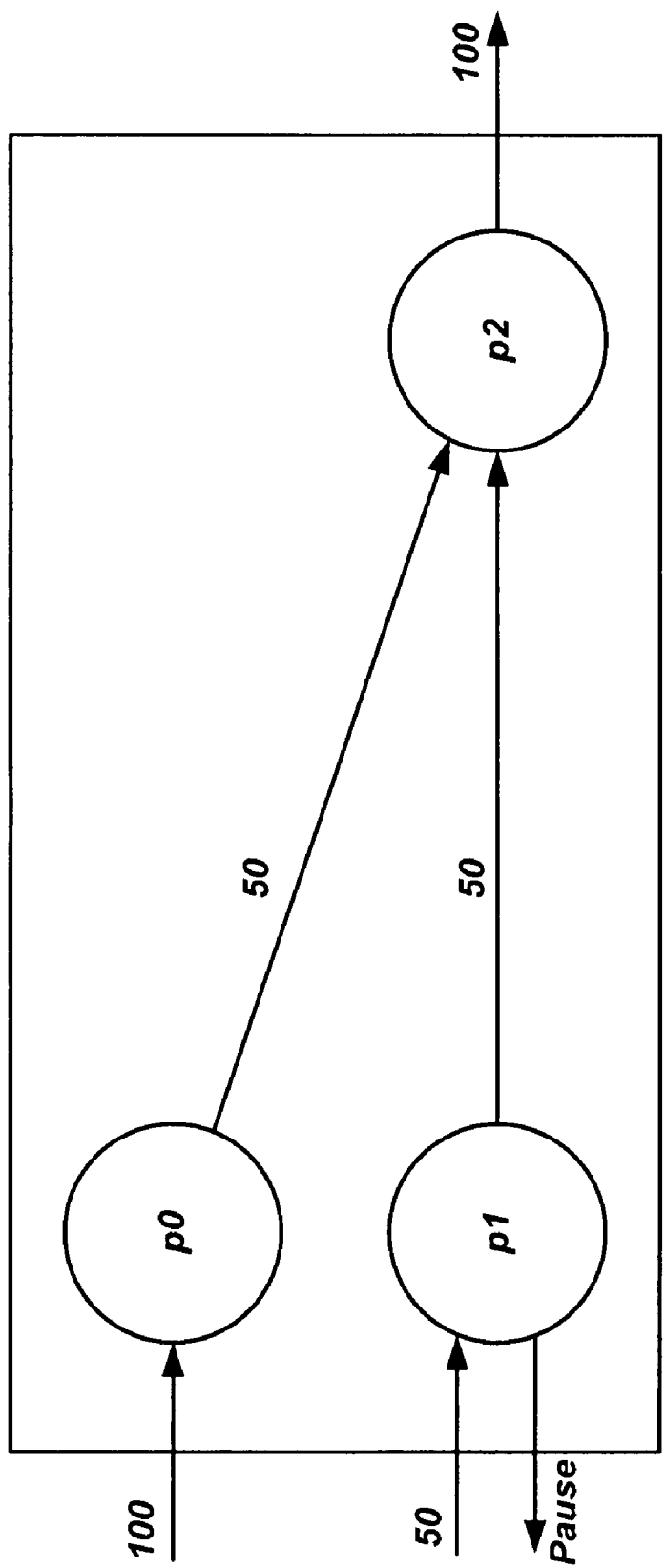
FIG. 13 shows a switch with mixed-mode ports according to one implementation.

The chill state implementations described herein always keep uncongested flows at full rate, regardless of whether flow control is enabled. This feature allows these implementations to perform very well even with mixed-mode flows (that is, where some ports have flow control enabled while other ports have flow control disabled). FIG. 13 shows a switch with mixed-mode ports according to one implementation. Ports p0 and p1 both switch to port p2. All of the ports are configured for 100 Mbps. Port p0 has flow control disabled. Port p1 has flow control enabled. In the steady state, port p1 exercises flow control to reduce the rate of data it receives to 50 Mbps, and port p0 drops 50% of the frames it receives, so that port p2 runs at full rate.

Some of the implementations that implement quality of service when flow control is disabled include an additional feature that solves a problem known as head-of-line blocking (HOLB). HOLB occurs when congested flows in a switch cause frames to be dropped from uncongested flows. Consider the following case, illustrated in FIG. 14, which shows four ports p0, p1, p2, and p3 in a switch. All of the ports run at 100 Mbps. In this case, all of the frames have the same class of service. However, HOLB is a problem with multiple of classes of service as well.

Port p1 sends all of its frames to port p3. Port p0 sends 50% of its frames to port p2, and sends the other 50% of its frames to port p3. Port p2 is uncongested. However, port p3 is congested because the amount of data arriving at port p3 is greater than the amount of data port p3 can transmit. In a conventional switch, the congestion at port p3 causes both ports p0 and p1 to begin dropping frames, including frames destined for uncongested port p2. For example, suppose the threshold for the forward/discard decision is 18, and that the size of the reserve module for port p0 is 18 when port p0 receives a class of service 0 frame destined for port p3. Because the size of the reserve module is equal to, or greater than, the threshold, switch 1002 enqueues the frame to the priority queue for port p3. Assume that the frame required one buffer for storage. Therefore one pointer is removed from the reserve module of port p0. Assume that, due to congestion at port p3, no free pointers are available. Therefore the size of the reserve module drops to 17. Now assume a class of service 0 frame destined for port p2 arrives at port p0. Because the size of the reserve module is below threshold, that frame is discarded. Therefore a frame was dropped from the uncongested flow from port p0 to port p2 due to congestion at port p3.

In order to prevent HOLB, some implementations base the decision to forward or discard a frame not only on the level of pointers in the reserve module 406 of the port 202 that received the frame, but also on the level of congestion at the output port to which the frame is destined. According to these implementations, each reserve module 406 implements a pair of predetermined thresholds for each class of service. One of the pair is used when the output port to which the frame is destined is congested, and the other of the pair is used when the output port to which the frame is destined is uncongested. In one implementation, the level of congestion at an output port depends on the class of service. Referring to FIG. 10, each output queue 408 has 4 priority queues 1004. Each priority queue 1004 includes a counter that maintains a count of the number of pointers in the priority queue. Each priority queue 1004 implements a predetermined threshold. When the number of pointers in a priority queue 1004 is equal to, or greater than, the predetermined threshold, that priority queue is congested. In one implementation, the threshold is 12. Each priority queue 1004 generates a congestion signal to inform the reserve modules 406 of the level of congestion in that priority queue. A reserve module 406 uses the congestion signal from a priority queue 1004 to select the proper threshold for a class of service when making the decision whether to enqueue a frame of that class of service to that priority queue.

Table 3 shows the thresholds, and their effects on each class of service, according to one implementation. The thresholds are selected to provide three regions. In one region, all frames are forwarded for both congested and uncongested flows. In another region, all frames are discarded for both congested and uncongested flows. In the remaining region, the forward/discard decision is based on both reserve module size and output port congestion. In one implementation, the difference between thresholds in a pair is 5. The size threshold below which all frames are discarded is selected as the maximum number of pointers required by a frame. In one implementation, the maximum number is 3. In Table 3, the number of pointers in the reserve module is denoted as "size."

TABLE 3

| size | when destination priority queue is uncongested, enqueue frames of: | when destination priority queue is congested, enqueue frames of: |
| --- | --- | --- |
| 23-27 | all classes of service | all classes of service |
| 18-22 | all classes of service | classes of service 3, 2, and 1 |
| 13-17 | classes of service 3, 2, and 1 | classes of service 3 and 2 |
| 8-12 | classes of service 3 and 2 | class of service 3 |
| 3-7 | class of service 3 | no classes of service |
| 0-2 | no classes of service | no classes of service |

The decision whether to enqueue a frame is made independently for each priority queue 904. Thus in a multicast operation, where a frame is destined for multiple priority queues 904, a reserve module 406 may enqueue the frame to some of the priority queues, but not to others, based on the congestion in the priority queues. For example, consider a frame received on port 0 of a switch that is destined for ports 1, 2, 3, 4, 5, and 6 of the switch. The frame has class of service 0, the reserve module size for port 0 is 18, and the priority queues for class of service 0 are congested in ports 1, 3, and 5. Using the thresholds of Table 3, the switch would enqueue the frame only to ports 2, 4, and 6.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method for sending a frame of data from a first channel to a second channel using at least one of m memory buffers for storing a frame, m being at least 2, in which n of the m buffers have an available status and p of the m buffers have an unavailable status, wherein m=n+p, the method comprising:
reserving for the first channel one or more of the n buffers having the available status when a number q of the buffers reserved for the first channel is less than a capacity r of reserve module buffers, wherein $q \leq r$;
when a frame is received from the first channel, storing the frame in i of the q buffers and changing the status of the i buffers to unavailable, wherein $1 \leq i \leq q$;
selectively assigning the frame to the second channel based on a number s of the q buffers, wherein $S \leq q$;
wherein if the frame is assigned to the second channel, the frame is sent to the second channel from the i buffers and the status of the i buffers is changed to available;
wherein h of the n buffers having the available status are not reserved to any channel, wherein $h+q \leq n$;
stopping reserving buffers for the first channel when the second channel is congested and the number of buffers h not reserved to any channel is less than, or equal to, a first predetermined threshold; and
starting reserving buffers for the first channel when the number of buffers h not reserved to any channel is greater than, or equal to, a second predetermined threshold.

2. The method of claim 1, wherein s=q.

3. The method of claim 1, wherein s=q−i.

4. The method of claim 2, wherein the selectively assigning step further comprises:
discarding the frame when the second channel is congested and the number of the s buffers is below a third predetermined threshold;
discarding the frame when the second channel is not congested and the number of the s buffers is below a fourth predetermined threshold, wherein the third predetermined threshold is greater than the fourth predetermined threshold; and
assigning the frame to the second channel when the number of the s buffers is equal to or greater than the third predetermined threshold.

5. The method of claim 2, wherein each frame has one of a plurality of classes of service, wherein each class of service has associated therewith third and fourth predetermined thresholds, and wherein the selectively assigning step further comprises:
discarding the frame when the second channel is congested and the number of the s buffers is below the third predetermined threshold of the associated class of service of the frame;
discarding the frame when the second channel is not congested and the number of the s buffers is below the fourth predetermined threshold of the associated class of service of the frame, wherein the third predetermined threshold of the associated class of service of the frame is greater than the fourth predetermined threshold of the associated class of service of the frame; and
assigning the frame to the second channel when the number of the s buffers is equal to or greater than the third predetermined threshold of the associated class of service of the frame.

6. The method of claim 4, wherein a port is associated with the second channel, and wherein the assigning step comprises:
sending, to the port, the identity of the i buffers storing the frame.

7. Computer-readable medium storing computer programs executable by a computer to perform a method for sending a frame of data from a first channel to a second channel using at least one of m memory buffers for storing a frame, m being at least 2, in which n of the m buffers have an available status and p of the m buffers have an unavailable status, wherein m=n+p, the method comprising:
reserving for the first channel one or more of the n buffers having the available status when a number q of the buffers reserved to the first channel is less than a capacity r of reserve module buffers, wherein $q \leq r$;
when a frame is received from the first channel, storing the frame in i of the q buffers and changing the status of the i buffers to unavailable, wherein $1 \leq i \leq q$;
selectively assigning the frame to the second channel based on a number s of the q buffers, wherein $s \leq q$;
wherein if the frame is assigned to the second channel, the frame is sent to the second channel from the i buffers and the status of the i buffers is changed to available;
wherein h of the n buffers having the available status are not reserved for any channel, wherein $h+q \leq n$;
stopping reserving buffers to the first channel when the second channel is congested and the number of buffers h not reserved for any channel is less than, or equal to, a first predetermined threshold; and
starting reserving buffers to the first channel when the number of buffers h not reserved for any channel is greater than, or equal to, a second predetermined threshold.

8. The computer-readable medium storing computer programs of claim 7, wherein s=q.

9. The computer-readable medium storing computer programs of claim 7, wherein s=q−i.

10. The computer-readable medium storing computer programs of claim 8, wherein the selectively assigning step further comprises:
discarding the frame when the second channel is congested and the number of the s buffers is below a third predetermined threshold;
discarding the frame when the second channel is not congested and the number of the s buffers is below a fourth predetermined threshold, wherein the third predetermined threshold is greater than the fourth predetermined threshold; and
assigning the frame to the second channel when the number of the s buffers is equal to or greater than the third predetermined threshold.

11. The computer-readable medium storing computer programs of claim 8, wherein each frame has one of a plurality of classes of service, wherein each class of service has associated therewith third and fourth predetermined thresholds, and wherein the selectively assigning step further comprises:
discarding the frame when the second channel is congested and the number of the s buffers is below the third predetermined threshold of the associated class of service of the frame;

discarding the frame when the second channel is not congested and the number of the s buffers is below the fourth predetermined threshold of the associated class of service of the frame, wherein the third predetermined threshold of the associated class of service of the frame is greater than the fourth predetermined threshold of the associated class of service of the frame; and assigning the frame to the second channel when the number of the s buffers is equal to or greater than the third predetermined threshold of the associated class of service of the frame.

12. The computer-readable medium storing computer programs of claim 10, wherein a port is associated with the second channel, and wherein the assigning step comprises:

sending, to the port, the identity of the i buffers storing the frame.

13. An apparatus for sending a frame of data from a first channel to a second channel, comprising:

a memory having m memory buffers for storing a frame, m being at least 2, in which n of the m buffers have an available status and p of the m buffers have an unavailable status, wherein m=n+p;

a reserve module to reserve for the first channel one or more of the n buffers having the available status when a number q of the buffers reserved for the first channel is less than a capacity r of the reserve module buffers, wherein $q \leq r$;

an ingress module to, when a frame is received from the first channel, store the frame in i of the q buffers and changes the status of the i buffers to unavailable, wherein $1 \leq i \leq q$;

a forwarding module to selectively assign the frame to the second channel based on a number s of the q buffers, wherein $s \leq q$;

wherein if the frame is assigned to the second channel, the frame is sent to the second channel from the i buffers and the status of the i buffers is changed to available;

wherein h of the n buffers having the available status are not reserved to any channel, wherein $h+q \leq n$, and the reserve module stops reserving buffers for the first channel when the second channel is congested and the number of buffers h not reserved for any channel is less than, or equal to, a first predetermined threshold; and wherein the reserve module starts reserving buffers to the first channel when the number of buffers h not reserved for any channel is greater than, or equal to, a second predetermined threshold.

14. The apparatus of claim 13, wherein s=q.

15. The apparatus of claim 13, wherein s=q−i.

16. The apparatus of claim 14, wherein the queue controller:

discards the frame when the second channel is congested and the number of the s buffers is below a third predetermined threshold;

discards the frame when the second channel is not congested and the number of the s buffers is below a fourth predetermined threshold, wherein the third predetermined threshold is greater than the fourth predetermined threshold; and assigns the frame to the second channel when the number of the s buffers is equal to or greater than the third predetermined threshold.

17. The apparatus of claim 14, wherein each frame has one of a plurality of classes of service, wherein each class of service has associated therewith third and fourth predetermined thresholds, and wherein the queue controller:

discards the frame when the second channel is congested and the number of the s buffers is below the third predetermined threshold of the associated class of service of the frame;

discards the frame when the second channel is not congested and the number of the s buffers is below the fourth predetermined threshold of the associated class of service of the frame, wherein the third predetermined threshold of the associated class of service of the frame is greater than the fourth predetermined threshold of the associated class of service of the frame; and assigns the frame to the second channel when the number of the s buffers is equal to or greater than the third predetermined threshold of the associated class of service of the frame.

18. The apparatus of claim 16, further comprising:

a port associated with the second channel, wherein the queue controller sends, to the port, the identity of the i buffers storing the frame.

19. A method for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel, the method comprising:

selecting, by the first device, the second device as a destination for the frame;

sending, by the first device, the frame to the first channel;

reserving to the first channel one or more of the n buffers having the available status when a number q of the buffers reserved to the first channel is less than a capacity r of reserve module buffers, wherein $q \leq r$;

when the frame is received from the first channel, storing the frame in i of the q buffers and changing the status of the i buffers to unavailable, wherein $1 \leq i \leq q$;

selectively assigning the frame to the second channel based on a number s of the q buffers, wherein $s \leq q$;

wherein if the frame is assigned to the second channel, the frame is sent to the second channel from the i buffers and the status of the i buffers is changed to available;

receiving, by the second device, the frame from the second channel if the frame is assigned to the second channel;

wherein h of the n buffers having the available status are not reserved to any channel, wherein $h+q \leq n$;

stopping reserving buffers to the first channel when the second channel is congested and the number of buffers h not reserved to any channel is less than, or equal to, a first predetermined threshold; and starting reserving buffers to the first channel when the number of buffers h not reserved to any channel is greater than, or equal to, a second predetermined threshold.

20. The method of claim 19, wherein s=q.

21. The method of claim 19, wherein s=q−i.

22. The method of claim 20, wherein the selectively assigning step further comprises:

discarding the frame when the second channel is congested and the number of the s buffers is below a third predetermined threshold;

discarding the frame when the second channel is not congested and the number of the s buffers is below a fourth predetermined threshold, wherein the third predetermined threshold is greater than the fourth predetermined threshold; and assigning the frame to the second channel when the number of the s buffers is equal to or greater than the third predetermined threshold.

23. The method of claim 20, wherein each frame has one of a plurality of classes of service, wherein each class of service has associated therewith third and fourth predetermined thresholds, and wherein the selectively assigning step further comprises:

discarding the frame when the second channel is congested and the number of the s buffers is below the third predetermined threshold of the associated class of service of the frame;

discarding the frame when the second channel is not congested and the number of the s buffers is below the fourth predetermined threshold of the associated class of service of the frame, wherein the third predetermined threshold of the associated class of service of the frame is greater than the fourth predetermined threshold of the associated class of service of the frame; and assigning the frame to the second channel when the number of the s buffers is equal to or greater than the third predetermined threshold of the associated class of service of the frame.

24. The method of claim 22, wherein a port is associated with the second channel, and wherein the assigning step comprises:

sending, to the port, the identity of the i buffers storing the frame.

25. Computer-readable medium storing computer programs executable by a computer to perform a method for sending a frame of data from a first device to a second device through a network switch having m memory buffers for storing a frame, m being at least 2, in which n of the m buffers have an available status and p of the m buffers have an unavailable status, wherein m=n+p, wherein the first device is connected to the network switch by a first channel and the second device is connected to the network switch by a second channel, the method comprising:

selecting, by the first device, the second device as a destination for the frame;

sending, by the first device, the frame to the first channel;

reserving to the first channel one or more of the n buffers having the available status when a number q of the buffers reserved for the first channel is less than a capacity r of reserve module buffers, wherein q$\leq$r;

when the frame is received from the first channel, storing the frame in i of the q buffers and changing the status of the i buffers to unavailable, wherein 1$\leq$i$\leq$q;

selectively assigning the frame to the second channel based on a number s of the q buffers, wherein s$\leq$q;

wherein if the frame is assigned to the second channel, the frame is sent to the second channel from the i buffers and the status of the i buffers is changed to available;

receiving, by the second device, the frame from the second channel if the frame is assigned to the second channel;

wherein h of the n buffers having the available status are not reserved for any channel, wherein h+q$\leq$n;

stopping reserving buffers for the first channel when the second channel is congested and the number of buffers h not reserved for any channel is less than, or equal to, a first predetermined threshold; and starting reserving buffers for the first channel when the number of buffers h not reserved for any channel is greater than, or equal to, a second predetermined threshold.

26. The computer-readable medium storing computer programs of claim 25, wherein s=q.

27. The computer-readable medium storing computer programs of claim 25, wherein s=q−i.

28. The computer-readable medium storing computer programs of claim 26, wherein the selectively assigning step further comprises:

discarding the frame when the second channel is congested and the number of the s buffers is below a third predetermined threshold;

discarding the frame when the second channel is not congested and the number of the s buffers is below a fourth predetermined threshold, wherein the third predetermined threshold is greater than the fourth predetermined threshold; and assigning the frame to the second channel when the number of the s buffers is equal to or greater than the third predetermined threshold.

29. The computer-readable medium storing computer programs of claim 26, wherein each frame has one of a plurality of classes of service, wherein each class of service has associated therewith third and fourth predetermined thresholds, and wherein the selectively assigning step further comprises:

discarding the frame when the second channel is congested and the number of the s buffers is below the third predetermined threshold of the associated class of service of the frame;

discarding the frame when the second channel is not congested and the number of the s buffers is below the fourth predetermined threshold of the associated class of service of the frame, wherein the third predetermined threshold of the associated class of service of the frame is greater than the fourth predetermined threshold of the associated class of service of the frame; and assigning the frame to the second channel when the number of the s buffers is equal to or greater than the third predetermined threshold of the associated class of service of the frame.

30. The computer-readable medium storing computer programs of claim 28, wherein a port is associated with the second channel, and wherein the assigning step comprises:

sending, to the port, the identity of the i buffers storing the frame.

31. A network comprising:

a network switch having m memory buffers for storing a frame of data, m being at least 2, in which n of the m buffers have an available status and p of the m buffers have an unavailable status, wherein m=n+p;

a first device connected to the network switch by a first channel;

a second device connected to the network switch by a second channel;

wherein the first device selects the second device as a destination for the frame and sends the frame to the first channel;

wherein the network switch reserves for the first channel one or more of the n buffers having the available status when the number q of the buffers reserved for the first channel is less than a capacity r, wherein q$\leq$r;

wherein when the frame is received from the first channel, the network switch stores the frame in i of the q buffers and changes the status of the i buffers to unavailable, wherein $1 \leq i \leq q$;

wherein the network switch selectively assigns the frame to the second channel based on a number s of the q buffers, wherein $s \leq q$;

wherein if the frame is assigned to the second channel, the frame is sent to the second channel from the i buffers and the status of the i buffers is changed to available;

wherein the second device receives the frame from the second channel if the frame is assigned to the second channel;

wherein h of the n buffers having the available status are not reserved for any channel, wherein $h+q \leq n$;

wherein the network switch stops reserving buffers to the first channel when the second channel is congested and the number of buffers h not reserved for any channel is less than, or equal to, a first predetermined threshold; and wherein the network switch starts reserving buffers for the first channel when the number of buffers h not reserved for any channel is greater than, or equal to, a second predetermined threshold.

32. The network of claim 31, wherein s=q.

33. The network of claim 31, wherein s=q−i.

34. The network of claim 32, wherein the network switch:

discards the frame when the second channel is congested and the number of the s buffers is below a third predetermined threshold;

discards the frame when the second channel is not congested and the number of the s buffers is below a fourth predetermined threshold, wherein the third predetermined threshold is greater than the fourth predetermined threshold; and assigns the frame to the second channel when the number of the s buffers is equal to or greater than the third predetermined threshold.

35. The network of claim 32, wherein each frame has one of a plurality of classes of service, wherein each class of service has associated therewith third and fourth predetermined thresholds, and wherein the network switch:

discards the frame when the second channel is congested and the number of the s buffers is below the third predetermined threshold of the associated class of service of the frame;

discards the frame when the second channel is not congested and the number of the s buffers is below the fourth predetermined threshold of the associated class of service of the frame, wherein the third predetermined threshold of the associated class of service of the frame is greater than the fourth predetermined threshold of the associated class of service of the frame; and assigns the frame to the second channel when the number of the s buffers is equal to or greater than the third predetermined threshold of the associated class of service of the frame.

36. The network of claim 34, wherein the network switch comprises:

a port associated with the second channel; and a queue controller to send, to the port, the identity of the i buffers storing the frame.

* * * * *

UNITED STATES PATENT AND TRADEMARK OFFICE
CERTIFICATE OF CORRECTION

PATENT NO. : 7,321,554 B1
APPLICATION NO. : 11/789315
DATED : January 22, 2008
INVENTOR(S) : Hugh Walsh et al.

It is certified that error appears in the above-identified patent and that said Letters Patent is hereby corrected as shown below:

Column 7, Line 9     Delete "are" after "406"
Column 19, Line 22     Delete "$S \leq q$" and insert -- $s \leq q$ --

Signed and Sealed this

Twenty-fourth Day of June, 2008

JON W. DUDAS
*Director of the United States Patent and Trademark Office*